United States Patent
Inoue et al.

(10) Patent No.: US 9,708,010 B2
(45) Date of Patent: Jul. 18, 2017

(54) VEHICLE POP-UP HOOD DEVICE

(71) Applicant: TOYOTA JIDOSHA KABUSHIKI KAISHA, Toyota-shi, Aichi (JP)

(72) Inventors: Katsuya Inoue, Nisshin (JP); Yoshinori Uozumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/111,074

(22) PCT Filed: Dec. 4, 2014

(86) PCT No.: PCT/JP2014/082177
§ 371 (c)(1),
(2) Date: Jul. 12, 2016

(87) PCT Pub. No.: WO2015/107793
PCT Pub. Date: Jul. 23, 2015

(65) Prior Publication Data
US 2016/0339963 A1 Nov. 24, 2016

(30) Foreign Application Priority Data
Jan. 20, 2014 (JP) .................................. 2014-008011

(51) Int. Cl.
*B62D 25/12* (2006.01)
*B60R 21/38* (2011.01)

(52) U.S. Cl.
CPC .............. *B62D 25/12* (2013.01); *B60R 21/38* (2013.01)

(58) Field of Classification Search
CPC ...... B62D 25/12; B62D 25/10; B62D 25/105; B60R 21/38
See application file for complete search history.

(56) References Cited

U.S. PATENT DOCUMENTS 6,345,679 B1 2/2002 Sasaki
2002/0014367 A1 2/2002 Sasaki et al.
(Continued)

FOREIGN PATENT DOCUMENTS

DE 102009040415 A1 3/2011
JP H11-263191 A 9/1999
(Continued)

OTHER PUBLICATIONS

Yusuke Inomata et al. "Development of the Pop-Up Engine Hood for Pedestrian Protection". Technical Report of Nissan Motos, No. 63, Sep. 2008, pp. 32-36.
(Continued)

*Primary Examiner* — Erez Gurari
(74) *Attorney, Agent, or Firm* — Oliff PLC

(57) ABSTRACT

In a vehicle pop-up hood device, an actuator is coupled to a swinging arm so as to be relatively movable in a vehicle upward direction, so when the actuator pushes up a hinge arm to a pushed-up position, the actuator moves from the pushed-up position to a raised position because of vibration that occurs in a hood. Furthermore, in the raised position, an engagement piece of the actuator engages with a coupling shaft unit of the swinging arm so that the actuator is retained in the raised position. The amplitude of the hood at this time becomes about two times the push-up amount of the actuator. Because of this, the push-up amount of the actuator becomes smaller compared to a case assuming that the actuator pushes up the hinge arm to the raised position, so the amplitude of the vibration of the hood can be reduced.

11 Claims, 18 Drawing Sheets

(56) References Cited

U.S. PATENT DOCUMENTS

| | | | |
|---|---|---|---|
| 2005/0179286 A1 | 8/2005 | Adachi | |
| 2009/0048734 A1 | 2/2009 | Iwai et al. | |
| 2009/0072587 A1 | 3/2009 | Inomata et al. | |
| 2010/0294584 A1* | 11/2010 | Yuasa | B60R 21/38 |
| | | | 180/274 |

FOREIGN PATENT DOCUMENTS

| | | | |
|---|---|---|---|
| JP | 2002-037016 A | 2/2002 |
| JP | 2005-225392 A | 8/2005 |
| JP | 2009-045965 A | 3/2009 |
| JP | 2009-067303 A | 4/2009 |
| JP | 2009-202871 A | 9/2009 |
| WO | 2014/013937 A1 | 1/2014 |

OTHER PUBLICATIONS

Nobuhiro Iwai et al. "Robust Design of Pop-Up Engine Hood in Dynamic Behavior for Pedestrian Safety". Provisional Proceedings of Academic Lecture of Society of Automotive Engineers of Japan, vol. 83, No. 9, May 22, 2009, pp. 1-6.
Jan. 10, 2017 Search Report issued in European Patent Application No. 14878440.8.

* cited by examiner

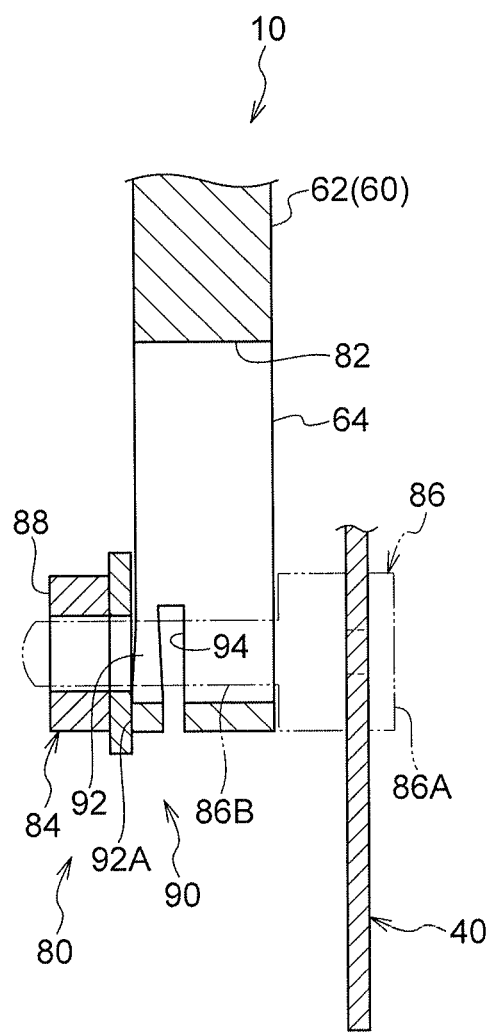

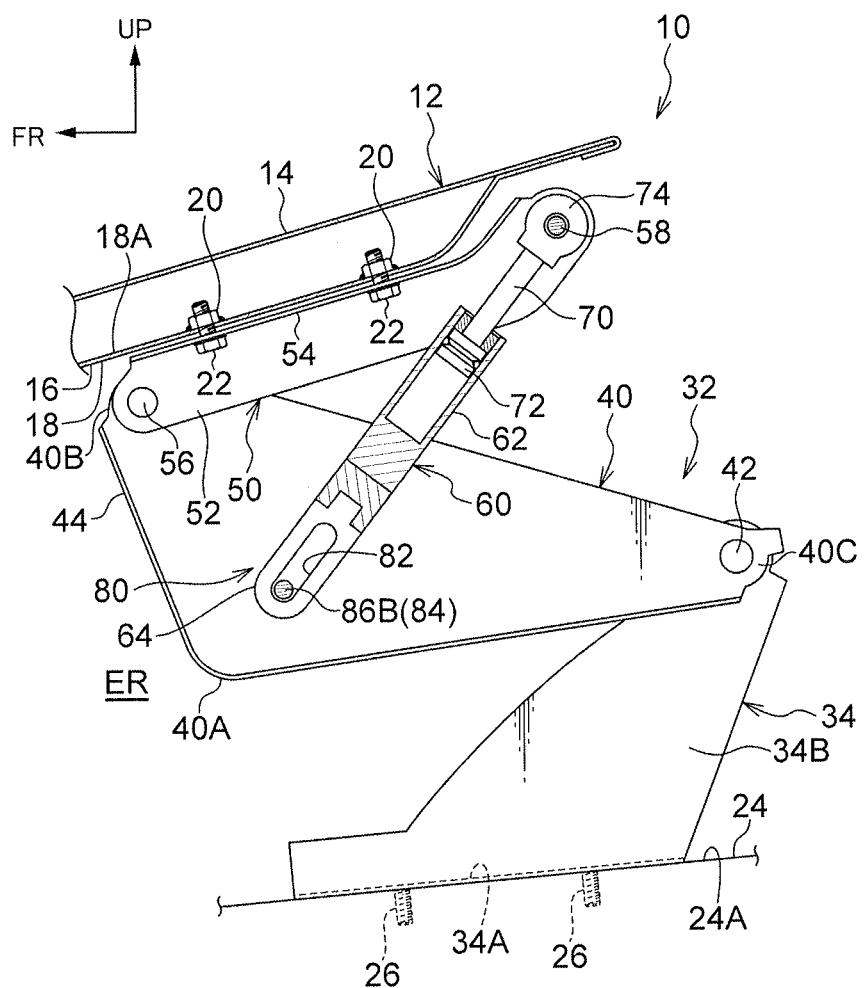

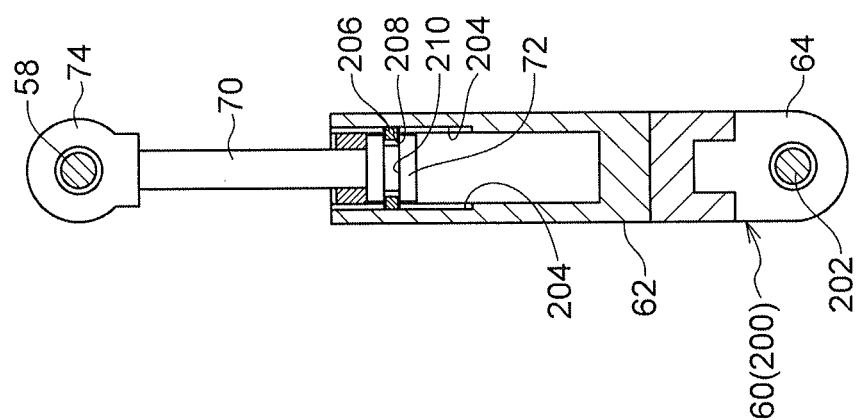

VEHICLE POP-UP HOOD DEVICE

BACKGROUND

Technical Field

The present invention relates to a vehicle pop-up hood device.

Related Art

In the vehicle pop-up hood device disclosed in patent document 1 listed below, a hood pushed up (kicked up) by an actuator can be temporarily displaced to a maximum kicked-up position (raised position) on the upper side of the position to which the hood has been pushed up (pushed-up position). Additionally, the pushed-up hood vibrates in the maximum kicked-up position, and the hood is finally supported by the actuator in a hood support position. Because of this, a clearance between the hood at the time when the hood has been pushed up and structures inside the engine compartment is ensured. It should be noted that examples of other vehicle pop-up hood devices are disclosed in patent document 2 to patent document 5 listed below.

CITATION LIST

Patent Literature

Patent Document 1: JP-A No. 2009-67303
Patent Document 2: JP-A No. 2009-45965
Patent Document 3: JP-A No. 2005-225392
Patent Document 4: JP-A No. 2009-202871
Patent Document 5: JP-A No. H11-263191

SUMMARY OF INVENTION

Technical Problem

However, in the above-described vehicle pop-up hood device, although consideration is given to the clearance between the hood at the time when the hood has been pushed up and structures inside the engine compartment, no consideration is given to reducing the amplitude of the vibration that occurs in the hood.

In consideration of the above-described circumstances, it is an object of the present invention to provide a vehicle pop-up hood device that can reduce the amplitude of the vibration that occurs when the hood is pushed up.

Solution to Problem

A vehicle pop-up hood device pertaining to a first aspect is equipped with: an arm that is coupled to a base secured to a vehicle body and is secured to both vehicle width direction end portions of a hood; an actuator which, upon being activated, pushes up the arm to a pushed-up position; and a retention mechanism that retains the arm displaced to a raised position on a vehicle upper side of the pushed-up position by vibration that occurs in the hood as a result of the actuator pushing up the arm.

In the vehicle pop-up hood device pertaining to the first aspect, the arm is coupled to the base secured to the vehicle body, and the arm is secured to both vehicle width direction end portions of the hood. Additionally, when the actuator is activated, the arm (that is, both vehicle width direction end portions of the hood) is pushed up to the pushed-up position. For this reason, the hood tends to vibrate in the upward and downward direction in such a way that both vehicle width direction end portions (the arm) of the hood become nodes and the vehicle width direction central portion of the hood becomes an antinode as seen from the vehicle forward and rearward direction.

Here, the arm (that is, both vehicle width direction end portions of the hood) displaced to the raised position on the vehicle upper side of the pushed-up position by the vibration that occurs in the hood as a result of the actuator pushing up the arm is retained by the retention mechanism. For this reason, both vehicle width direction end portions of the hood are retained in the raised position, so the rising amount of the hood with respect to the vehicle body is ensured. Furthermore, in a state in which both vehicle width direction end portions of the hood are retained in the raised position, the hood vibrates starting point at the raised position, but the amplitude of the vibration of the hood at this time becomes about two times the push-up amount of the actuator. Because of this, in the vehicle pop-up hood device pertaining to the first aspect, the push-up amount of the actuator becomes smaller compared to a case assuming that the vehicle pop-up hood device is configured in such a way that the actuator pushes up the arm (both vehicle width direction end portions of the hood) to the raised position, so the amplitude of the vibration of the hood that occurs when the hood is pushed up can be reduced.

A vehicle pop-up hood device pertaining to a second aspect is the first aspect, wherein the arm is rotatably coupled to a swinging arm rotatably supported on the base, the actuator is configured to include a cylinder that is coupled to the swinging arm and a rod that is coupled to the arm in a state in which the rod is housed in the cylinder and which becomes raised to the pushed-up position by a gas supplied to an inside of the cylinder, and the rod raised to the pushed-up position is relatively movable in a vehicle upward direction with respect to the swinging arm.

In the vehicle pop-up hood device pertaining to the second aspect, the swinging arm is rotatably supported on the base, and the arm is rotatably coupled to the swinging arm. Furthermore, the actuator is configured to include the rod coupled to the arm and the cylinder coupled to the swinging arm. That is to say, the actuator bridges the swinging arm and the arm.

Additionally, the rod raised to the pushed-up position is configured to be relatively movable in the vehicle upward direction with respect to the swinging arm. Because of this, the arm pushed up to the pushed-up position can be relatively rotated to the raised position with respect to the swinging arm. Consequently, even in a case where the arm is coupled to the base via the swinging arm, the amplitude of the vibration of the hood that occurs when the hood is pushed up can be reduced.

A vehicle pop-up hood device pertaining to a third aspect is the second aspect, wherein the cylinder is coupled to the swinging arm so as to be relatively movable in the vehicle upward direction, the retention mechanism has an engagement portion disposed on the cylinder, and the cylinder is retained in the raised position as a result of the engagement portion becoming directly or indirectly engaged with the swinging arm in the raised position.

In the vehicle pop-up hood device pertaining to the third aspect, the cylinder is coupled to the swinging arm so as to be relatively movable in the vehicle upward direction. Because of this, after the rod has pushed up the arm to the pushed-up position, the cylinder relatively moves in the vehicle upward direction with respect to the swinging arm, so that the rod raised to the pushed-up position relatively moves in the vehicle upward direction with respect to the swinging arm. As a result, the arm becomes displaced from the pushed-up position to the raised position.

Moreover, the retention mechanism has the engagement portion disposed on the cylinder, and the cylinder is retained in the raised position as a result of the engagement portion becoming directly or indirectly engaged with the swinging arm in the raised position. Because of this, the arm can be retained in the raised position utilizing the actuator that pushes up the arm.

A vehicle pop-up hood device pertaining to a fourth aspect is the third aspect, wherein a shaft portion is disposed on one of the swinging arm and the cylinder, and the shaft portion projects toward the other of the swinging arm and the cylinder, and a long hole is formed at the other of the swinging arm and the cylinder, the shaft portion is slidably inserted into the long hole, and the long hole allows the cylinder to be coupled to the swinging arm so as to be relatively movable in the vehicle upward direction.

A vehicle pop-up hood device pertaining to a fifth aspect is the fourth aspect, wherein in a non-activated state of the actuator, the shaft portion is placed in an end portion on one lengthwise direction side of the long hole, and in a state in which the cylinder is retained in the raised position, the shaft portion is placed in an end portion on the other lengthwise direction side of the long hole.

In the vehicle pop-up hood device pertaining to the fourth and fifth aspects, after the rod has been raised to the pushed-up position, the shaft portion slides inside the long hole in such a way that the cylinder relatively moves in the vehicle upward direction with respect to the swinging arm, so that the rod relatively moves in the vehicle upward direction with respect to the swinging arm. As a result, the arm becomes displaced from the pushed-up position to the raised position. Additionally, in the raised position the shaft portion is brought into contact with the inner peripheral portion of the long hole, so the arm can be precisely placed in the raised position.

A vehicle pop-up hood device pertaining to a sixth aspect is the fourth or fifth aspect, wherein a sliding amount of the shaft portion with respect to the long hole is set smaller compared to a rising amount of the rod that becomes raised to the pushed-up position.

In the vehicle pop-up hood device pertaining to the sixth aspect, the sliding amount of the shaft portion with respect to the long hole is set smaller compared to the rising amount of the rod that becomes raised to the pushed-up position, so the hood can be well displaced to the raised position by the vibration of the hood that occurs when the actuator has pushed up the hood to the pushed-up position.

A vehicle pop-up hood device pertaining to a seventh aspect is any one of the third to sixth aspects, wherein the engagement portion is configured to be elastically deformable, and the cylinder is retained in the raised position as a result of the engagement portion coming into contact with the swinging arm directly or via another member and becoming elastically deformed.

In the vehicle pop-up hood device pertaining to the seventh aspect, in a state in which the engagement portion is elastically deformed, the engagement portion and the swinging arm or the other member are brought into contact with each other. For this reason, the arm can be retained in the raised position by frictional force that occurs between the engagement portion and the swinging arm or the other member.

A vehicle pop-up hood device pertaining to an eighth aspect is the second aspect, wherein gas escape portions are formed at the cylinder, the gas escape portions discharging to an outside of the cylinder the gas supplied to the inside of the cylinder as a result of the rod being raised to the pushed-up position, the retention mechanism is equipped with an engagement portion formed at an inner peripheral portion of the cylinder and an engagement counterpart member disposed on the rod, and the rod is retained in the raised position as a result of the engagement counterpart member becoming engaged with the engagement portion in the raised position.

A vehicle pop-up hood device pertaining to a ninth aspect is the eighth aspect, wherein the gas escape portions are gas escape grooves formed at an inner peripheral edge portion of the cylinder, and the gas escape grooves extend along an axial direction of the cylinder.

In the vehicle pop-up hood device pertaining to the eighth and ninth aspects, the gas escape portions are formed at the cylinder. Additionally, when the rod is raised to the pushed-up position, the gas supplied to the inside of the cylinder is discharged to the outside of the cylinder by the gas escape portions. Because of this, the raised rod temporarily stops in the pushed-up position.

Then, when the rod rises together with the arm from the pushed-up position to the raised position because of the vibration that occurs in the hood, the engagement counterpart member disposed on the rod engages with the engagement portion formed at the inner peripheral portion of the cylinder so that the rod (that is, the arm) is retained in the raised position. Consequently, after the actuation of the actuator, the rod can be raised to the raised position while allowing the gas inside the cylinder to escape.

A vehicle pop-up hood device pertaining to a tenth aspect is the second aspect, wherein the rod is configured to include a first rod and a second rod, the first rod has a tubular portion having a tubular shape, the second rod is coupled to the arm and is housed in the tubular portion so as to be relatively movable in an axial direction of the actuator, the retention mechanism is equipped with an engagement portion formed at an inner peripheral portion of the tubular portion and an engagement counterpart member disposed on the second rod, and the second rod is retained in the raised position as a result of the engagement counterpart member becoming engaged with the engagement portion in the raised position.

In the vehicle pop-up hood device pertaining to the tenth aspect, the rod is configured to include the first rod and the second rod, and the second rod is coupled to the arm. Furthermore, the second rod is housed in the tubular portion so as to be relatively movable in the axial direction of the actuator. That is to say, the rod has a dual structure, and the second rod relatively moves with respect to the first rod so that the second rod raised to the pushed-up position relatively moves in the vehicle upward direction with respect to the swinging arm. As a result, the arm becomes displaced from the pushed-up position to the raised position.

Additionally, when the second rod rises to the raised position, the engagement counterpart member disposed on the second rod becomes engaged with the engagement portion formed at the inner peripheral portion of the tubular portion so that the second rod (that is, the arm) is retained in the raised position. Consequently, the second rod can be relatively moved in the vehicle upward direction with respect to the swinging arm while controlling an increase in the axial direction extent of the actuator.

A vehicle pop-up hood device pertaining to an eleventh aspect is the first aspect, wherein the arm is rotatably coupled to a swinging arm rotatably supported on the base, the retention mechanism is equipped with an engagement portion formed at the swinging arm and an engagement counterpart member having one end portion rotatably coupled to the arm, and the arm is retained in the raised position as a result of the engagement counterpart member being rotated in accompaniment with a relative rotation of the arm with respect to the swinging arm and the other end portion of the engagement counterpart member becoming engaged with the engagement portion.

In the vehicle pop-up hood device pertaining to the eleventh aspect, the swinging arm is rotatably supported on the base, and the arm is rotatably coupled to the swinging arm. Furthermore, one end portion of the engagement counterpart member is rotatably coupled to the arm. Additionally, when the arm relatively rotates from the pushed-up position to the raised position with respect to the swinging arm because of the vibration that occurs in the hood, the engagement counterpart member rotates, the other end portion of the engagement counterpart member becomes engaged with the engagement portion formed at the swinging arm, and the arm is retained in the raised position. Consequently, in a case where the arm is coupled to the base via the swinging arm, the arm can be retained in the raised position by a simple configuration.

Advantageous Effects of Invention

According to the vehicle pop-up hood device pertaining to the first aspect, the amplitude of the vibration of the hood that occurs when the hood is pushed up can be reduced.

According to the vehicle pop-up hood device pertaining to the second aspect, even in a case where the arm is coupled to the base via the swinging arm, the amplitude of the vibration of the hood that occurs when the hood is pushed up can be reduced.

According to the vehicle pop-up hood device pertaining to the third aspect, the arm can be retained in the raised position utilizing the actuator that pushes up the hood.

According to the vehicle pop-up hood device pertaining to the fourth and fifth aspects, the arm can be precisely placed in the raised position.

According to the vehicle pop-up hood device pertaining to the sixth aspect, the hood can be well displaced to the raised position by the vibration of the hood that occurs when the actuator has pushed up the hood to the pushed-up position.

According to the vehicle pop-up hood device pertaining to the seventh aspect, the arm can be retained in the raised position by frictional force that occurs between the engagement portion and the swinging arm or the other member.

According to the vehicle pop-up hood device pertaining to the eighth and ninth aspects, after the actuation of the actuator, the rod can be raised to the raised position while allowing the gas inside the cylinder to escape.

According to the vehicle pop-up hood device pertaining to the tenth aspect, the second rod can be relatively moved in the vehicle upward direction with respect to the swinging arm while controlling an increase in the axial direction extent of the actuator.

According to the vehicle pop-up hood device pertaining to the eleventh aspect, in a case where the arm is coupled to the base via the swinging arm, the arm can be retained in the raised position by a simple configuration.

BRIEF DESCRIPTION OF DRAWINGS

FIG. 3B is a cross-sectional view showing a state in which the cylinder has risen to a raised position from the state shown in FIG. 3A.

FIG. 4B is a partially cut side view showing a state in which the hinge arm has been raised to the raised position from the state shown in FIG. 4A.

FIG. 8C is a cross-sectional view showing a state in which the rod has been raised to the raised position from the state shown in FIG. 8B.

DESCRIPTION OF EMBODIMENTS

First Embodiment

Figure 1:
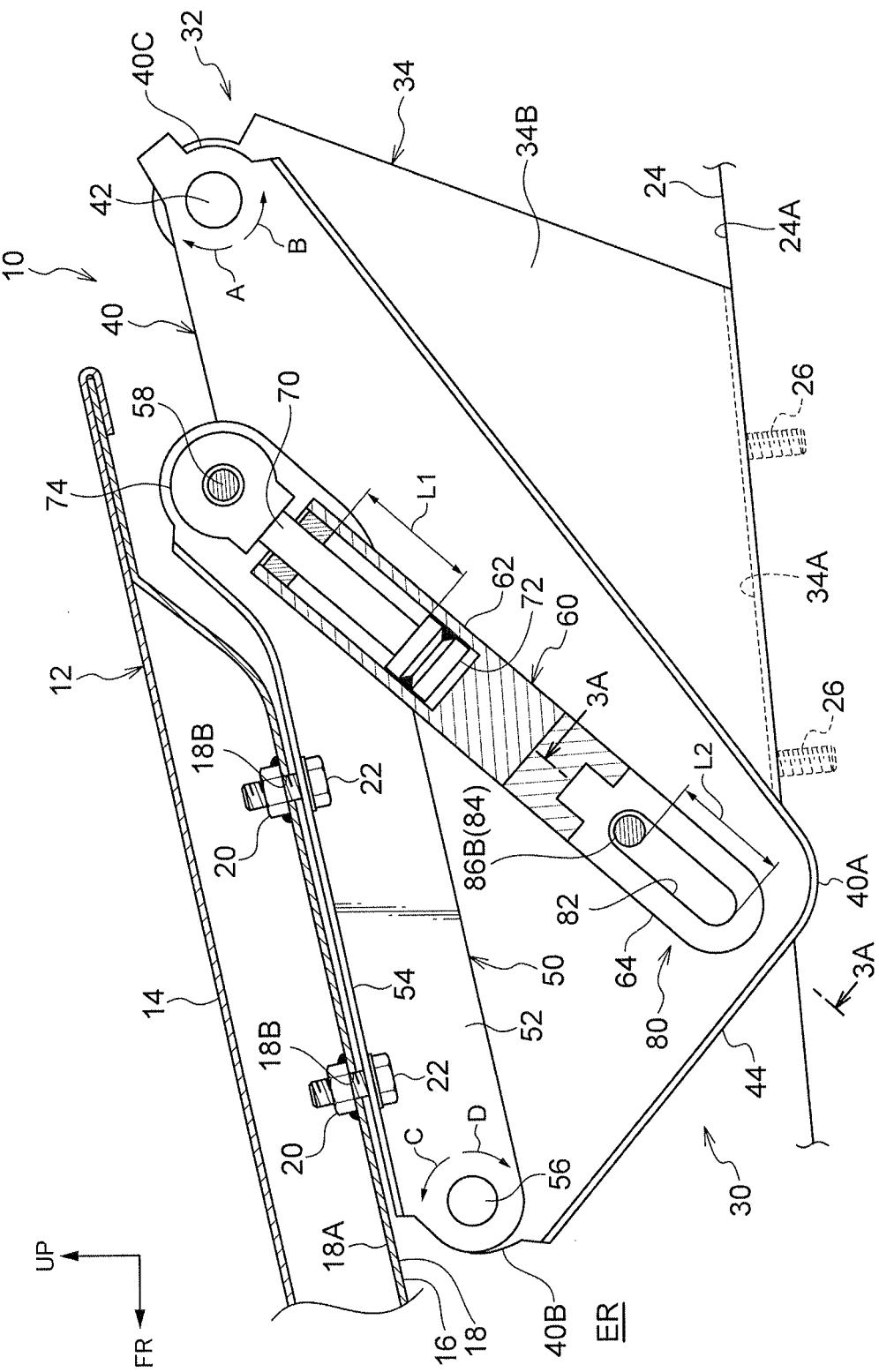
FIG. 1 is a partially cut side view, as seen from inside in a vehicle width direction, showing an enlargement of a pop-up mechanism portion placed on a vehicle right side in a vehicle pop-up hood device pertaining to a first embodiment.

A vehicle pop-up hood device 10 pertaining to a first embodiment will be described below using FIG. 1 to FIG. 6. It should be noted that arrow FR appropriately shown in the drawings indicates a vehicle forward direction, arrow UP indicates a vehicle upward direction, and arrow RH indicates a vehicle rightward direction.

Figure 2:
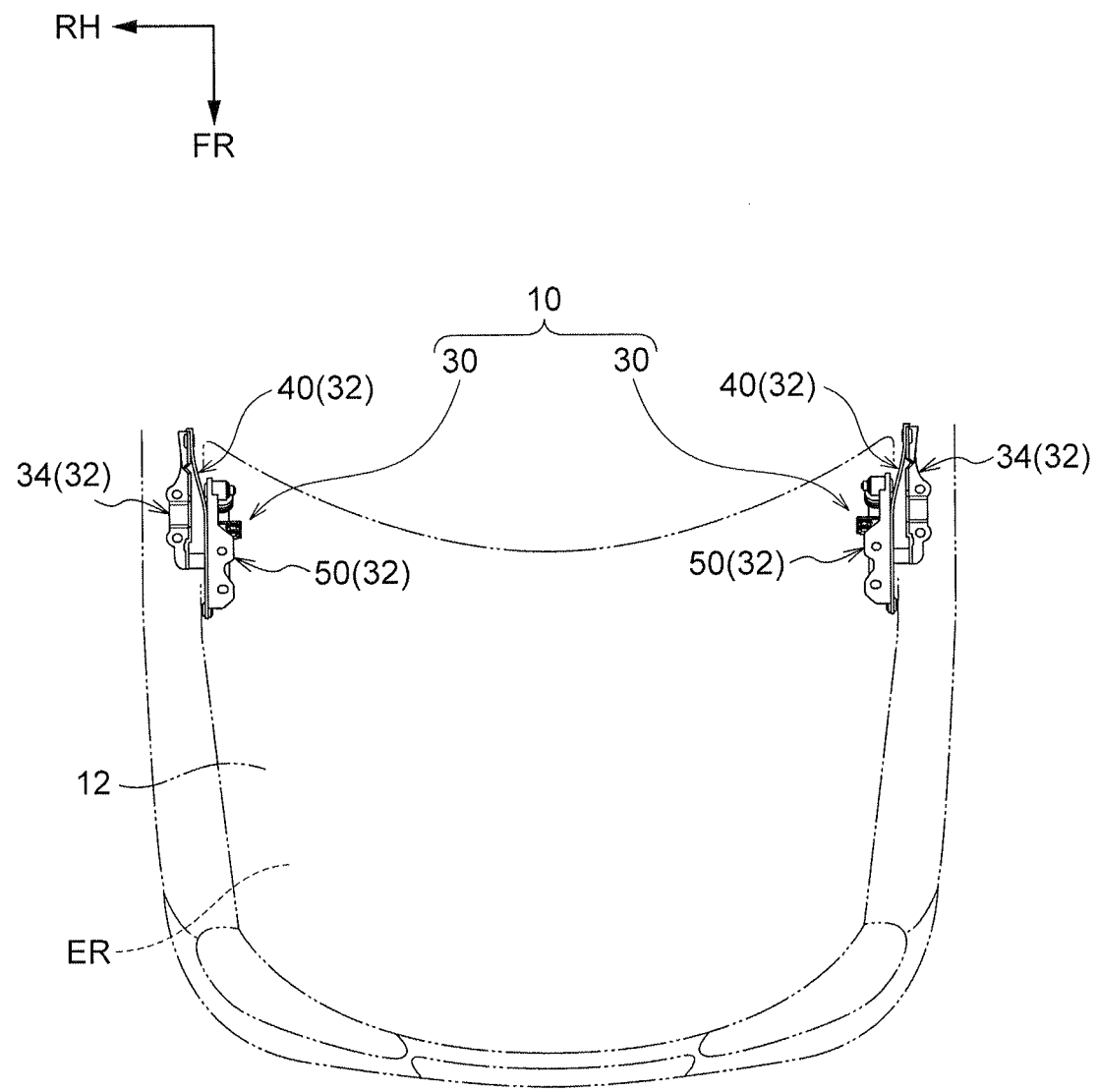
FIG. 2 is a plan view showing the entire configuration of the vehicle pop-up hood device shown in FIG. 1.

As shown in FIG. 2, the vehicle pop-up hood device 10 takes as its main portions and is configured by a pair of pop-up mechanism portions 30 disposed in a hood 12 that opens and closes an engine compartment (a power unit compartment) ER. The pop-up mechanism portions 30 are disposed in both vehicle width direction end portions of the rear end portion of the hood 12, and the right and left pop-up hood mechanism portions 30 are both identically configured. For this reason, in the description below, the pop-up mechanism portion 30 placed on the vehicle right side will be described and description of the pop-up mechanism portion 30 placed on the vehicle left side will be omitted.

As shown in FIG. 1, the pop-up mechanism portion 30 is configured to include a hood hinge 32, which supports the hood 12 in such a way that the hood 12 can be opened and closed, and an actuator 60, which is activated at the time of an impact with an impactor such as a pedestrian. Furthermore, in the pop-up mechanism portion 30, the actuator 60 is coupled by a coupling mechanism 80 to a swinging arm 40 configuring the hood hinge 32, and the hood 12 raised in the vehicle upward direction is retained by a retention mechanism 90 (see FIG. 3A and FIG. 3B). Below, first the hood 12 will be described and then the configurations of each portion mentioned above will be described.

The hood 12 is configured to include a hood outer panel 14, which is placed on the vehicle outside and configures a design surface, and a hood inner panel 16, which is placed on the engine compartment ER side and reinforces the hood outer panel 14. Additionally, the terminal portions of both are joined to each other by hemming. Furthermore, in a state in which the hood 12 is closing the engine compartment ER (the state shown in FIG. 1), the front end portion of the hood 12 is secured to a vehicle body by a hood lock not shown in the drawings.

Furthermore, a bulging portion 18 is formed at the rear end side (rear portion side) of the hood inner panel 16. The bulging portion 18 bulges in the vehicle downward direction side (the engine compartment ER side) with respect to the hood inner panel 16, and a bottom wall 18A of the bulging portion 18 is placed substantially parallel to the hood outer panel 14 as seen in a side sectional view. Furthermore, a pair of weld nuts 20 for securing a hinge arm 50 described later are disposed on the upper surface of the bottom wall 18A. Moreover, insertion holes 18B are formed through the bottom wall 18A, and the insertion holes 18B are placed coaxially with the weld nuts 20.

Regarding Hood Hinge 32

As shown in FIG. 1, the hood hinge 32 is configured to include a hinge base 34 serving as a "base" secured to the vehicle body, a swinging arm 40 rotatably coupled to the hinge base 34, and a hinge arm 50 serving as an "arm" secured to the hood 12. The hinge base 34 is formed in a substantially inverted L-shape as seen in a vehicle front view and is formed in a substantially V-shape (see FIG. 4A and FIG. 4B for details) that opens obliquely forward in the vehicle upward direction as seen in a side view seen from inside in the vehicle width direction. Furthermore, the hinge base 34 is equipped with a plate-shaped attachment portion 34A that extends along the vehicle forward and rearward direction. The attachment portion 34A is placed on an upper surface portion 24A of a cowl top side 24, which is a vehicle body-side constituent member, in such a way that its plate thickness direction coincides with the substantially vehicle upward and downward direction. It should be noted that the cowl top side 24 is disposed on both sides of a cowl that extends along the vehicle width direction between the rear end side of the hood 12 and the lower end portion of a windshield glass. Furthermore, a pair of attachment holes not shown in the drawings are formed through the attachment portion 34A, and attachment bolts 26 are inserted inside the attachment holes so that the attachment portion 34A is secured to the upper surface portion 24A by the attachment bolts 26. Moreover, the hinge base 34 is equipped with a support portion 34B, and the support portion 34B is bent in the vehicle upward direction from the vehicle width direction inside end portion of the attachment portion 34A and is formed in a plate shape whose plate thickness direction coincides with the substantially vehicle width direction.

The swinging arm 40 is placed on the vehicle width direction inside of the hinge base 34 and is formed in a substantially inverted triangular plate shape as seen in a side view. Specifically, the swinging arm 40 is, as seen in a side view, formed in a substantially inverted triangular plate shape having as vertices a lower end portion 40A, a front end portion 40B placed on the vehicle front side and the vehicle upper side of the lower end portion 40A, and a rear end portion 40C placed on the vehicle rear side and the vehicle upper side of the lower end portion 40A.

Furthermore, the rear end portion 40C of the swinging arm 40 is hinge-joined to the upper end portion of the support portion 34B of the hinge base 34 by a hinge pin 42 whose axial direction coincides with the vehicle width direction. Because of this, the swinging arm 40 is configured to be rotatable in the vehicle upward and downward direction (the direction of arrow A and the direction of arrow B in FIG. 1) using the hinge pin 42 as a rotational center. Moreover, a flange portion 44 is integrally formed on the outer peripheral portion of the swinging arm 40 in the section thereof excluding the upper edge interconnecting the front end portion 40B and the rear end portion 40C, and the flange portion 44 extends inward in the vehicle width direction from the swinging arm 40.

The hinge arm 50 is placed on the vehicle width direction inside of the swinging arm 40 and extends along the substantially vehicle forward and rearward direction. Specifically, the hinge arm 50 is equipped with a side wall portion 52 placed substantially parallel to the swinging arm 40. The front end portion of the side wall portion 52 is hinge-joined to the front end portion 40B of the swinging arm 40 by a hinge pin 56 whose axial direction coincides with the vehicle width direction. Because of this, the hinge arm 50 is configured to be relatively rotatable with respect to the swinging arm 40 in the vehicle upward and downward direction (the direction of arrow C and the direction of arrow D in FIG. 1) using the hinge pin 56 as a rotational center.

Furthermore, the hinge arm 50 is equipped with a top wall portion 54. The top wall portion 54 is formed bent inward in the vehicle width direction from the upper end portion of the side wall portion 52 and extends in the substantially vehicle forward and rearward direction along the undersurface of the bulging portion 18 of the hood 12. Attachment holes not shown in the drawings are formed through the top wall portion 54 in positions opposing the aforementioned weld nuts 20. Additionally, hinge bolts 22 are inserted inside the attachment holes and the insertion holes 18B in the bulging portion 18 from the vehicle lower side and are screwed into the weld nuts 20, so that the top wall portion 54 is fastened (secured) to the bulging portion 18. Because of this, the hinge base 34 and (the bulging portion 18 of) the hood 12 are coupled to each other by the hinge arm 50 and the swinging arm 40.

Moreover, a coupling shaft 58 for coupling a rod 70 of the actuator 60 described later is integrally disposed on the rear end portion of the side wall portion 52 of the hinge arm 50. The coupling shaft 58 is formed in a substantially cylindrical shape and projects inward in the vehicle width direction from the side wall portion 52.

It should be noted that the hood hinge 32 is originally a hinge part for supporting the hood 12 on the body (vehicle body) in such a way that the hood 12 can be opened and closed. Specifically, the hinge arm 50 and the swinging arm 40 are joined to each other by a shear pin or the like not shown in the drawings, and when the hood 12 opens and closes the engine compartment ER, the swinging arm 40 rotates using the hinge pin 42 as a rotational center in a state in which relative rotation of the hinge arm 50 with respect to the swinging arm 40 is regulated.

Regarding Actuator 60

As shown in FIG. 1, the actuator 60 is formed in a substantially cylindrical shape and is placed on the vehicle width direction inside of the swinging arm 40. Furthermore, the actuator 60 is placed in such a way as to bridge the rear end portion of the hinge arm 50 and the lower end portion 40A of the swinging arm 40, so that the actuator 60 slopes in the vehicle rearward direction heading in the vehicle upward direction as seen in a side view. Moreover, the actuator 60 has a cylinder 62 and a rod 70 housed inside the cylinder 62.

The cylinder 62 is formed in a substantially bottomed round tubular shape that opens in the vehicle upward direction. The lower end portion of the cylinder 62 serves as a coupling portion 64, and the cylinder 62 is coupled at the coupling portion 64 to the swinging arm 40 by the coupling mechanism 80 described later. Furthermore, a gas generation device not shown in the drawings is housed inside the cylinder 62 of the actuator 60. The gas generation device is electrically connected to an ECU (control means) not shown in the drawings, and the ECU is electrically connected to an impact detection sensor that detects an impact with an impactor such as a pedestrian.

The rod 70 is formed in a substantially round rod shape, is placed coaxially with the cylinder 62, and is housed inside the cylinder 62. Furthermore, a piston 72 is integrally disposed on the lower end portion of the rod 70. The piston 72 is formed in a substantially cylindrical shape and is placed coaxially with the rod 70. Furthermore, the piston 72 is housed inside the cylinder 62 in a state in which the space between the outer peripheral surface of the piston 72 and the inner peripheral surface of the cylinder 62 is sealed. Additionally, when a gas generated by the gas generation device is supplied to the inside of the cylinder 62, the piston 72 (the rod 70) rises along the axial direction of the cylinder 62 because of the gas pressure inside the cylinder 62. Furthermore, the rising amount of the rod 70 at this time is L1.

Furthermore, a rod coupling portion 74 is integrally disposed on the upper end portion of the rod 70, and the rod coupling portion 74 is formed in a substantially round tubular shape whose axial direction coincides with the vehicle width direction. Additionally, the coupling shaft 58 of the hinge arm 50 is inserted inside the rod coupling portion 74, so that the upper end portion of the rod 70 is coupled so as to be relatively rotatable with respect to the hinge arm 50.

Additionally, when the actuator 60 is activated from a non-activated state (the state shown in FIG. 1) of the actuator 60, the rod 70 moves in the vehicle upward direction in accompaniment with the rising of the piston 72. Because of this, the rear end portion of the hinge arm 50 is pushed up in the vehicle upward direction by the rod coupling portion 74 of the rod 70, and the hood 12 becomes placed in a pushed-up position (the position shown in FIG. 4A). It should be noted that at this time the shear pin joining together the hinge arm 50 and the swinging arm 40 breaks and the hinge arm 50 is relatively rotated in the vehicle upward direction (the direction of arrow C in FIG. 1) with respect to the swinging arm 40 using the hinge pin 56 as a rotational center. Furthermore, in conjunction with the rotation of the hinge arm 50 the swinging arm 40 is configured to be relatively rotated in the vehicle upward direction (the direction of arrow A in FIG. 1) with respect to the hinge base 34 using the hinge pin 42 as a rotational center. Moreover, in the pushed-up position, the piston 72 is configured to be locked to the cylinder 62 by a lock mechanism not shown in the drawings.

Regarding Coupling Mechanism 80

Figure 3A:
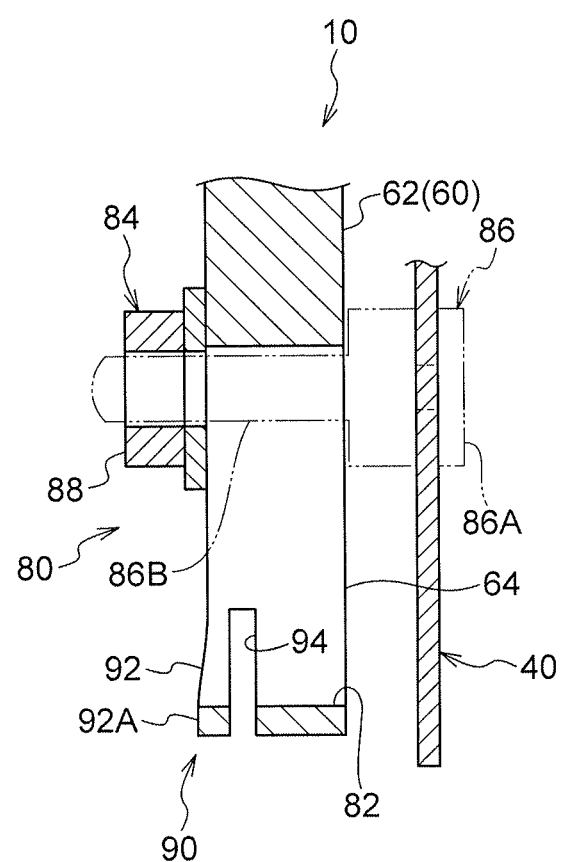
FIG. 3A is a cross-sectional view (an enlarged cross-sectional view along line 3A-3A of FIG. 1) showing a coupled state of a swinging arm and a cylinder shown in FIG. 1.
Figure 4A:
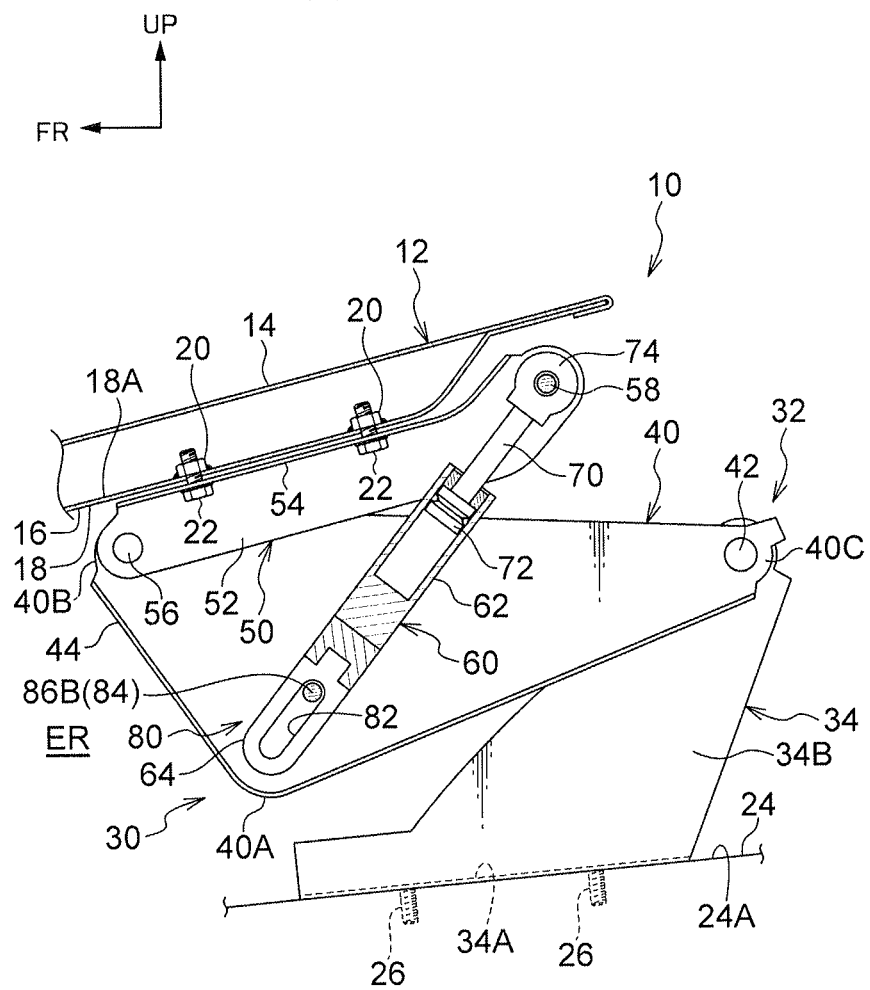
FIG. 4A is a partially cut side view showing a state in which a rod has pushed up a hinge arm to a pushed-up position from the state shown in FIG. 1.

As shown in FIG. 1 and FIG. 3A, the coupling mechanism 80 is applied to the section that couples together the cylinder 62 of the actuator 60 and the swinging arm 40. Furthermore, the coupling mechanism 80 is configured to include a long hole 82, which is formed at the coupling portion 64 of the cylinder 62, and a coupling shaft unit 84, which serves as a "shaft portion" disposed on the swinging arm 40.

The long hole 82 is formed running through the vehicle width direction and is formed in a cross-sectionally substantially track shape whose lengthwise direction coincides with the axial direction of the actuator 60 (the cylinder 62) as seen in a side view. That is, the long hole 82 slopes in the vehicle rearward direction heading in the vehicle upward direction as seen in a side view. Additionally, the lengthwise direction length of the long hole 82 is L2, and in the present embodiment L2 is set to 0.6 times L1.

As shown in FIG. 3A, the coupling shaft unit 84 has a coupling bolt 86 and a coupling nut 88. The coupling bolt 86 is configured to include a bolt base portion 86A, which is integrally disposed in a portion of the swinging arm 40 on the outskirts of the lower end portion 40A, and a substantially cylindrical threaded portion 86B, which projects inward in the vehicle width direction from the bolt base portion 86A. The outer diameter dimension of the threaded portion 86B is set slightly smaller than the width dimension of the long hole 82, and the threaded portion 86B is inserted inside the long hole 82 in the cylinder 62. Male threads are formed on the outer peripheral portion of the threaded portion 86B, the coupling nut 88 is screwed onto the distal end portion of the threaded portion 86B, and the coupling nut 88 is locked to the threaded portion 86B by an adhesive or the like. Moreover, in this state, a slight gap is formed between the coupling nut 88 and the coupling portion 64 of the cylinder 62 in the axial direction of the coupling shaft unit 84. Because of this, the lower end portion of the cylinder 62 is coupled so as to be relatively rotatable about the axis of the coupling bolt 86 with respect to the swinging arm 40 and is coupled so as to be relatively movable in the lengthwise direction of the long hole 82 with respect to the swinging arm 40.

Moreover, in the non-activated state of the actuator 60, the coupling bolt 86 is placed in the upper end portion of the long hole 82 (see FIG. 3A). Because of this, after the rod 70 has pushed up the hinge arm 50 to the pushed-up position, the actuator 60 (the cylinder 62) relatively moves in the vehicle upward direction with respect to the coupling shaft unit 84 (the swinging arm 40) (that is to say, the coupling shaft unit 84 relatively moves from the upper end portion to the lower end portion of the long hole 82 in the actuator 60), so that together with the actuator 60 the hinge arm 50 (both vehicle width direction end portions of the hood 12) becomes displaced to the vehicle upper side of the pushed-up position (see FIG. 3B). Additionally, as shown in FIG. 4B, the position where the coupling shaft unit 84 is placed in the lower end portion of the long hole 82 is a raised position, and in the raised position the threaded portion 86B of the coupling shaft unit 84 is brought into contact with the inner peripheral portion of the lower end portion of the long hole 82.

Regarding Retention Mechanism 90

As shown in FIG. 3A, the retention mechanism 90 has an engagement piece 92 serving as an "engagement portion", and the engagement piece 92 is formed on the lower end portion of the coupling portion 64 of the cylinder 62. Specifically, a slit 94 that opens to the lower end side of the cylinder 62 is formed at the coupling portion 64 of the cylinder 62, and the slit 94 runs through the width direction of the cylinder 62. Additionally, the section of the coupling portion 64 on the vehicle width direction inside of the slit 94 serves as the engagement piece 92, and the engagement piece 92 is configured to be elastically deformable in the vehicle width direction. The vehicle width direction inside surface of the engagement piece 92 slopes inward in the vehicle width direction (the coupling nut 88 side) heading toward the lower end side of the cylinder 62 as seen from the width direction of the cylinder 62. Furthermore, the lower end portion of the engagement piece 92 serves as a contact portion 92A, and the contact portion 92A projects more inward in the vehicle width direction (the coupling nut 88 side) than the coupling portion 64. Additionally, when the actuator 60 relatively moves with respect to the swinging arm 40 from the pushed-up position to the raised position, the contact portion 92A of the engagement piece 92 comes into contact with the coupling nut 88, and the engagement piece 92 is configured to become elastically deformed outward in the vehicle width direction (see FIG. 3B). Moreover, when the engagement piece 92 becomes elastically deformed outward in the vehicle width direction and the engagement piece 92 and the coupling shaft unit 84 engage with each other, the hinge arm 50 coupled to the rod 70 of the actuator 60 and the hood 12 are retained in the raised position.

Next, the action and effects of the present embodiment will be described.

The state shown in FIG. 1 is a non-activated state of the vehicle pop-up hood device 10. At the time of this state, the actuator 60 is in the non-activated state, so most of the rod 70 is housed inside the cylinder 62 of the actuator 60. Furthermore, the rod coupling portion 74 (the upper end portion) of the rod 70 is rotatably coupled to the coupling shaft 58 (the rear end portion) of the hinge arm 50.

From this state, when the vehicle frontally impacts an impactor such as a pedestrian, the fact that the vehicle has frontally impacted an impactor is detected by impact detection means, and an impact signal is output to the ECU. The ECU judges whether or not it should activate the vehicle pop-up hood device 10 on the basis of the impact signal that has been input, and when the ECU judges that it should activate the vehicle pop-up hood device 10, an actuation signal is output to the actuator 60. Because of this, the gas generation device of the actuator 60 is activated and the gas is supplied to the inside of the cylinder 62.

When the gas is supplied to the inside of the cylinder 62, the piston 72 of the rod 70 rises inside the cylinder 62 because of the gas pressure inside the cylinder 62, and the rod 70 moves in its axial direction in the vehicle upward direction. When the rod 70 moves in its axial direction in the vehicle upward direction, the rod 70 pushes up the rear end portion of the hinge arm 50 in the vehicle upward direction so that both vehicle width direction end portions of the hood 12 are pushed up to the pushed-up position (see FIG. 4A). At this time, the shear pin joining together the hinge arm 50 and the swinging arm 40 becomes broken so that the hinge arm 50 is relatively rotated in the vehicle upward direction with respect to the swinging arm 40 and the swinging arm 40 is relatively rotated in the vehicle upward direction with respect to the hinge base 34.

Figure 5:
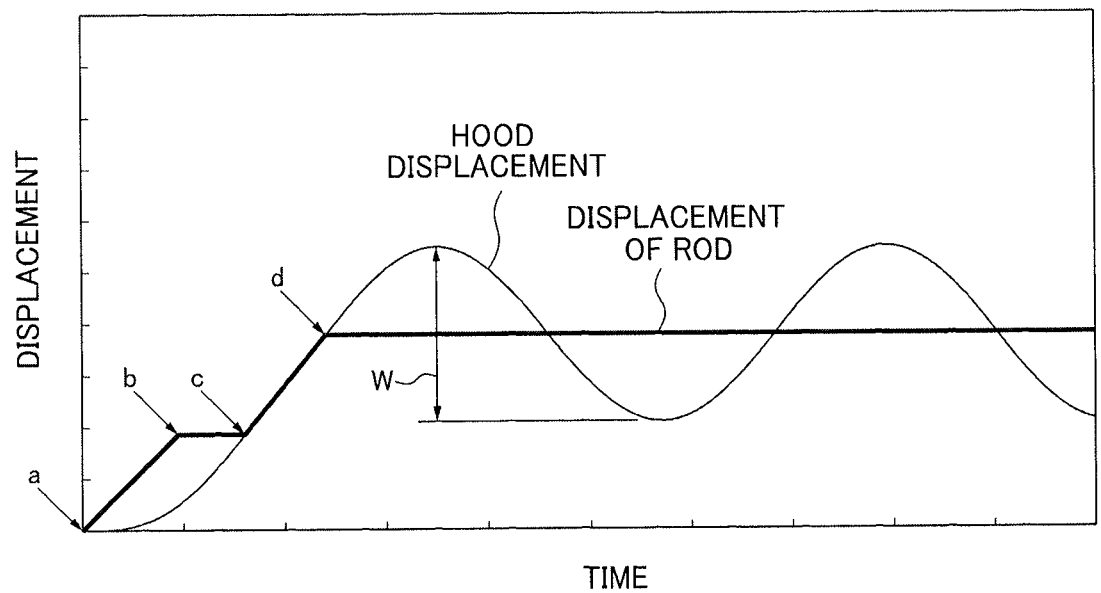
FIG. 5 is a graph for describing the behavior of a vehicle width direction central portion of a hood rear end portion when the rod shown in FIG. 1 has pushed up the hinge arm.

Next, the behavior of the hood 12 when the actuator 60 pushes up the hinge arm 50 (the hood 12) will be described using the graph shown in FIG. 5. This graph shows theoretical displacement of the vehicle width direction central portion of the hood 12 rear end portion when the actuator 60 has been activated. Furthermore, in the graph in FIG. 5, the horizontal axis represents time and the vertical axis represents displacement. Moreover, the bold line in FIG. 5 represents displacement of the rod 70 of the actuator 60 and the fine line represents displacement of the vehicle width direction central portion of the hood 12 rear end portion.

As shown in this drawing, when the rod 70 pushes up the hinge arm 50 (both vehicle width direction end portions of the hood 12 rear end portion) (the period from point a to point b in FIG. 5), inertial force acts on the vehicle width direction central portion of the hood 12 rear end portion. For this reason, the vehicle width direction central portion of the hood 12 rear end portion becomes displaced in the vehicle upward direction later than both vehicle width direction end portions of the hood 12 rear end portion. Then, when the rod 70 rises to the pushed-up position, the rod 70 becomes locked to the cylinder 62 by the lock mechanism not shown in the drawings. Because of this, the pushing-up of the rod 70 with respect to the hinge arm 50 is completed and the push-up force resulting from the rod 70 no longer acts on the hinge arm 50 (see the period from point b to point c in FIG. 5). For this reason, the hood 12 tends to vibrate in the upward and downward direction in such a way that both vehicle width direction end portions (the hinge arm 50) of the hood 12 become nodes and the vehicle width direction central portion of the hood 12 becomes an antinode as seen from the vehicle rear side.

Then, in a state in which the vehicle width direction central portion of the hood 12 rear end portion has reached the pushed-up position (a state in which point c in FIG. 5 has been reached), the hood 12 tends to become displaced in the vehicle upward direction with respect to the pushed-up position because the hood 12 has velocity in the vehicle upward direction. That is to say, both vehicle width direction end portions of the hood 12 rear end portion tend to become displaced in the vehicle upward direction. For this reason, the hinge arm 50 secured to both vehicle width direction end portions of the hood 12 rear end portion and the actuator 60 coupled to the hinge arm 50 also tend to become displaced in the vehicle upward direction.

Here, the lower end portion of the actuator 60 (the cylinder 62) is coupled by the coupling mechanism 80 to the swinging arm 40 so as to be relatively movable in the vehicle upward direction. Specifically, the long hole 82 is formed at the coupling portion 64 of the cylinder 62, and the long hole 82 extends in the axial direction of the actuator 60. Furthermore, the coupling shaft unit 84 is disposed on the swinging arm 40, and the coupling shaft unit 84 is slidably inserted inside the long hole 82 in the cylinder 62 and is placed in the upper end portion of the long hole 82.

For this reason, when the actuator 60 tends to become displaced in the vehicle upward direction, the long hole 82 in the cylinder 62 slides in the vehicle upward direction with respect to the coupling shaft unit 84 of the swinging arm 40, so that the actuator 60 relatively moves in the vehicle upward direction with respect to the swinging arm 40. Because of this, the hinge arm 50 and both vehicle width direction end portions of the hood 12 rear end portion become displaced to the raised position (the position of point d in FIG. 5) on the vehicle upper side of the pushed-up position. That is, both vehicle width direction end portions of the hood 12 that become the nodes of the vibration that occurs in the hood 12 become displaced to the raised position.

Furthermore, the engagement piece 92 configuring the retention mechanism 90 is formed on the coupling portion 64 of the cylinder 62. Additionally, when the cylinder 62 moves to the raised position, the contact portion 92A of the engagement piece 92 comes into contact with the coupling nut 88 of the coupling shaft unit 84, and the engagement piece 92 becomes elastically deformed outward in the vehicle width direction. Because of this, the engagement piece 92 and the coupling shaft unit 84 engage with each other, and the actuator 60 (the cylinder 62) moved to the raised position is retained. As a result, the hinge arm 50 and both vehicle width direction end portions of the hood 12 are retained in the raised position, and the rising amount of the hood 12 with respect to the vehicle body is ensured. Furthermore, in a state in which both vehicle width direction end portions of the hood 12 are retained in the raised position, the hood 12 vibrates starting point at the raised position, but the amplitude W (see arrow W in FIG. 5) of the vibration of the hood 12 at this time becomes about two times the push-up amount L1 of the actuator 60.

As a comparative example with respect to the first embodiment, in a case assuming that the rod 70 of the actuator 60 is configured to push up the hinge arm 50 (both vehicle width direction end portions of the hood 12 rear end portion) to the raised position, the push-up amount by which the hood 12 is pushed up by the rod 70 becomes L1+L2. For this reason, in the comparative example, the amplitude of the vibration of the hood 12 starting point at the raised position becomes about two times the push-up amount (L1+L2). Because of this, according to the vehicle pop-up hood device 10 of the first embodiment, compared to the comparative example, the hood 12 can be raised to the raised position while reducing the push-up amount by which the hood 12 is pushed up by the rod 70, and the hood 12 can be retained in the raised position. As a result, the amplitude of the vibration of the hood 12 that occurs when the hood 12 is pushed up can be reduced.

Figure 6A:
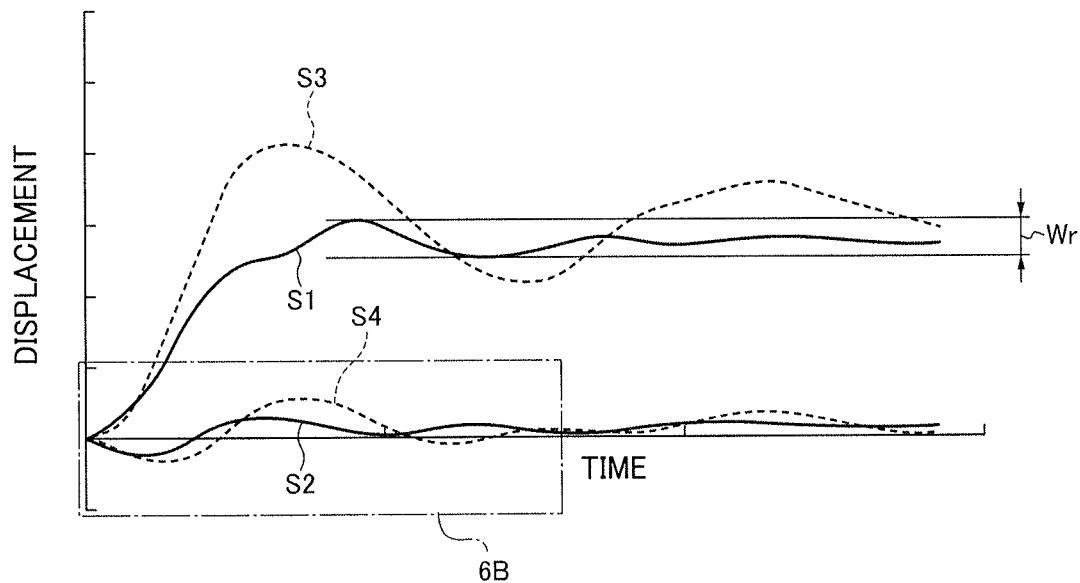
FIG. 6A is a graph showing, as compared to a comparative example, vibration waveforms in the vehicle width direction central portion of the hood rear end portion and a vehicle width direction central portion of a hood front end portion when the rod shown in FIG. 1 has pushed up the hinge arm.
Figure 6B:
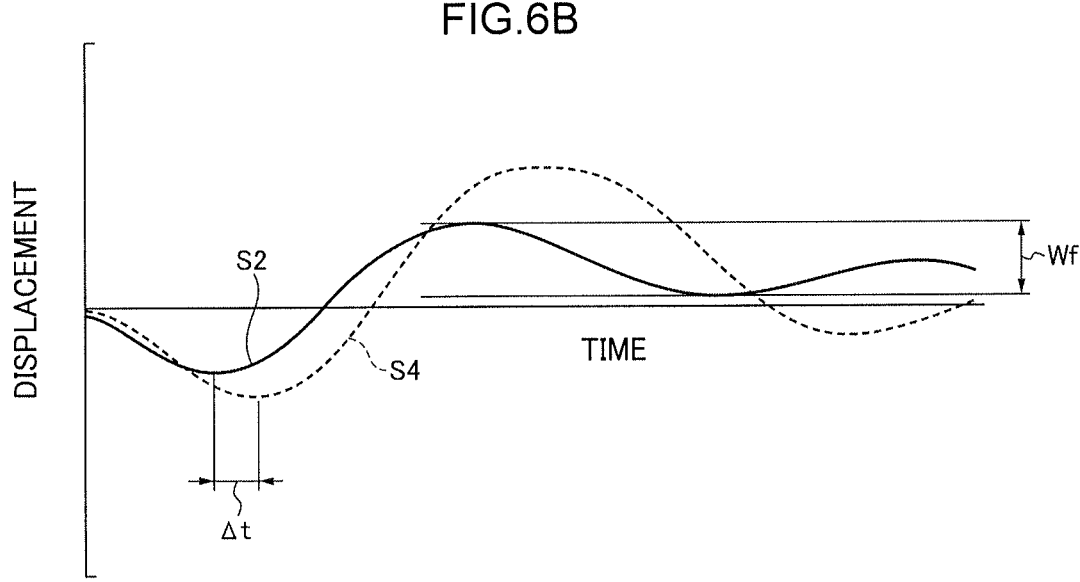
FIG. 6B is a graph showing an enlargement of portion 6B of FIG. 6A.

Below, data obtained by making a comparison to the comparative example with regard to this point are shown in FIG. 6A. FIG. 6A shows, as compared to the comparative example, vibration waveforms of the vehicle width direction central portion of the hood 12 rear end portion and the vehicle width direction central portion of the hood 12 front end portion when both vehicle width direction end portions of the hood 12 rear end portion have been pushed up. Additionally, in FIG. 6A, vibration waveform S1 indicated by a solid line is the vibration waveform of the vehicle width direction central portion of the hood 12 rear end portion in the first embodiment, and vibration waveform S2 indicated by a solid line is the vibration waveform of the vehicle width direction central portion of the hood 12 front end portion in the first embodiment. Furthermore, vibration waveform S3 indicated by a dashed line is the vibration waveform of the vehicle width direction central portion of the hood 12 rear end portion in the comparative example, and vibration waveform S4 indicated by a dashed line is vibration waveform data of the vehicle width direction central portion of the hood 12 front end portion in the comparative example. Moreover, FIG. 6B shows an enlargement of portion 6B enclosed by the long dashed short dashed line in FIG. 6A. It should be noted that, in the graphs shown in FIG. 6A and FIG. 6B, the horizontal axis represents time and the vertical axis represents displacement.

Additionally, as is apparent from FIG. 6A, in the initial stage of the vibration that occurs in the rear end portion of the hood 12, the amplitude in the first embodiment (see arrow Wr in FIG. 6A) is significantly smaller compared to the amplitude in the comparative example. Furthermore, as shown also in FIG. 6B, also in the initial stage of the vibration that occurs in the hood 12 front end portion, the amplitude in the first embodiment (see arrow Wf in FIG. 6A) is significantly smaller compared to the amplitude in the comparative example. Because of what is described above, the amplitude of the vibration of the hood 12 that occurs when the hood 12 is pushed up can be reduced.

Furthermore, as described above, (the cylinder 62 of) the actuator 60 is coupled by the coupling mechanism 80 so as to be relatively movable in the vehicle upward direction with respect to the swinging arm 40, and the hinge arm 50 becomes displaced from the pushed-up position to the raised position. Moreover, as described above, the engagement piece 92 configuring the retention mechanism 90 is formed on the cylinder 62, and the engagement piece 92 engages with the coupling nut 88 of the coupling shaft unit 84 in the raised position, so that the hinge arm 50 is retained in the raised position. Because of this, the hood 12 (the hinge arm 50) can be displaced to the raised position and retained in the raised position utilizing the actuator 60 that pushes up the hood 12 (the hinge arm 50).

Moreover, as described above, the coupling mechanism 80 is configured to include the coupling shaft unit 84 disposed on the swinging arm 40 and the long hole 82 formed at the cylinder 62. Additionally, when the cylinder 62 relatively moves with respect to the swinging arm 40 from the pushed-up position to the raised position, the coupling shaft unit 84 slides from the upper end portion to the lower end portion of the long hole 82 and is brought into contact with the inner peripheral portion of the lower end portion of the long hole 82. For this reason, the cylinder 62 (the hinge arm 50) can be precisely placed in the raised position.

Furthermore, the engagement piece 92 is configured to be elastically deformable in the axial direction of the coupling shaft unit 84 (the vehicle width direction). Additionally, the contact portion 92A of the engagement piece 92 comes into contact with the coupling nut 88 of the coupling shaft unit 84, and the engagement piece 92 becomes elastically deformed outward in the vehicle width direction, so that the engagement piece 92 and the coupling shaft unit 84 engage with each other. For this reason, the actuator 60 (the hinge arm 50) can be retained in the raised position by frictional force that occurs between the engagement piece 92 and the coupling shaft unit 84.

Moreover, as described above, in the first embodiment, the push-up amount by which the rod 70 pushes up the hinge arm 50 is set smaller compared to the comparative example. Because of this, compared to the comparative example, when the vehicle pop-up hood device 10 pushes up the rear end portion of the hood 12 in the vehicle upward direction, the front end portion of the hood 12 can be pushed up in the vehicle upward direction at an early stage. This point will be described below.

When the vehicle pop-up hood device 10 pushes up the rear end portion of the hood 12 in the vehicle upward direction, the hood 12 tends to rotate about its own center of gravity as seen in a side view. That is to say, the front end portion of the hood 12 tends to become displaced in the vehicle downward direction. At the same time, the front end portion of the hood 12 is locked to the vehicle body by the hood lock, so the displacement of the front end portion of the hood 12 in the vehicle downward direction is limited. For this reason, the rear end portion of the hood 12 is pushed up while the hood 12 undergoes bending deformation. Additionally, the push-up force with which the rod 70 pushes up the hood 12 no longer acts at the point in time when the pushing-up by the rod 70 is completed, so the hood 12 is returned to its original state by the restoring force of the hood 12 and the front end portion of the hood 12 is pushed up in the vehicle upward direction.

Here, as mentioned above, in the first embodiment, the push-up amount by which the rod 70 pushes up the hinge arm 50 is set small compared to the comparative example. For this reason, in the first embodiment, compared to the comparative example, the time in which the rod 70 pushes up the hinge arm 50 (both vehicle width direction end portions of the hood 12) becomes shorter, and as a result the time in which the front end portion of the hood 12 is returned to its original state by the restoring force also becomes quicker (see Δt shown in FIG. 6B). Because of this, the front end portion of the hood 12 can be pushed up in the vehicle upward direction at an earlier stage compared to the comparative example.

It should be noted that although in the first embodiment the long hole 82 is formed at the cylinder 62 of the actuator 60 and the coupling shaft unit 84 is disposed on the swinging arm 40, the long hole 82 may also be formed at the swinging arm 40 and the coupling shaft unit 84 may also be disposed on the cylinder 62. In this case, the engagement piece 92 of the actuator 60 may be configured to directly engage with the swinging arm 40 in the raised position.

Furthermore, in the first embodiment, the engagement piece 92 is integrally formed on the cylinder 62, but the engagement piece 92 and the cylinder 62 may also be separately configured. In this case, the engagement piece 92 may be configured by a springy plate, and the engagement piece 92 may be configured to be secured to the cylinder 62.

Second Embodiment

Figure 7A:
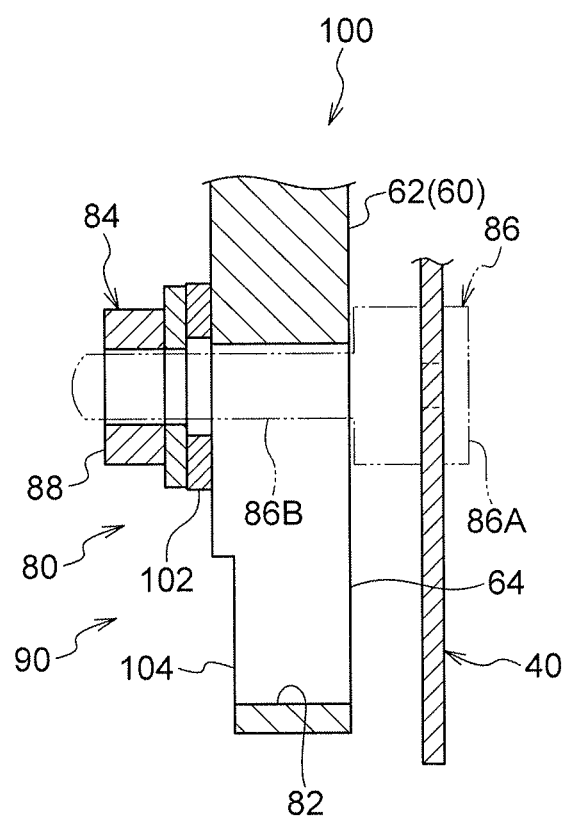
FIG. 7A is a cross-sectional view, corresponding to FIG. 3A, showing a coupling mechanism and a retention mechanism used in a second embodiment.
Figure 7B:
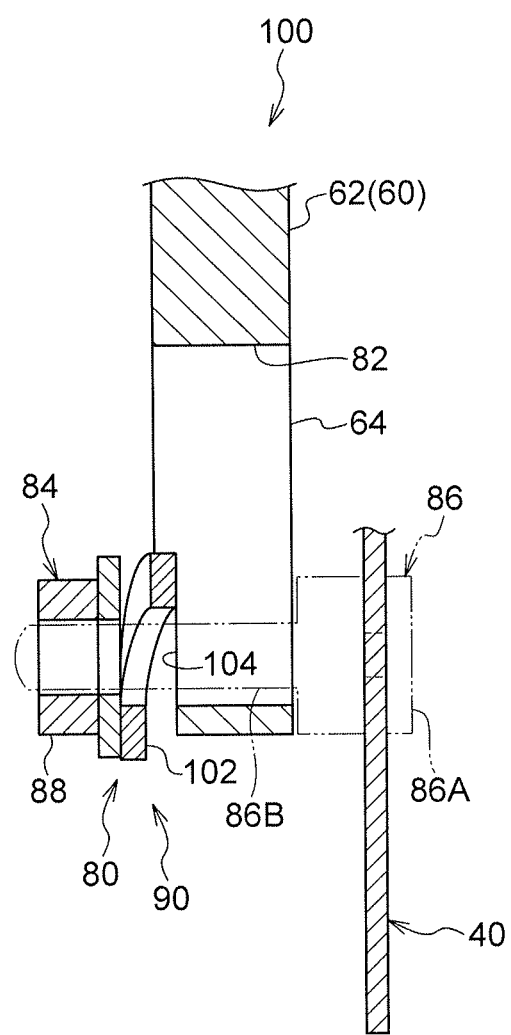
FIG. 7B is a cross-sectional view, corresponding to FIG. 3B, showing a state in which the cylinder has risen to the raised position from the state shown in FIG. 7A.

A vehicle pop-up hood device 100 pertaining to a second embodiment will be described below using FIG. 7A and FIG. 7B. The vehicle pop-up hood device 100 of the second embodiment is configured like in the first embodiment except for the points described below.

That is, in the second embodiment, the retention mechanism 90 has a spring washer 102 (an element to be broadly understood as an "engagement counterpart member") formed in a substantially annular shape. Additionally, the threaded portion 86B of the coupling shaft unit 84 is inserted inside the spring washer 102, and the spring washer 102 is placed between the coupling nut 88 of the coupling shaft unit 84 and the cylinder 62 of the actuator 60.

Furthermore, in the second embodiment, the engagement piece 92 of the first embodiment is dispensed with, and an engagement recess portion 104 serving as an "engagement portion" is formed at the coupling portion 64 of the cylinder 62. The engagement recess portion 104 is formed in a step shape as seen from the width direction of the cylinder 62 and opens inward in the vehicle width direction and toward the lower end side of the cylinder 62. Moreover, the lower end portion of the long hole 82 formed at the cylinder 62 is placed inside the engagement recess portion 104, and when the cylinder 62 has moved to the raised position, the spring washer 102 is set so as to be placed inside the engagement recess portion 104 (see FIG. 7B).

Additionally, like in the first embodiment, when the actuator 60 is activated, the gas is supplied to the inside of the cylinder 62, the rod 70 rises to the pushed-up position, and the hinge arm 50 is pushed up to the pushed-up position. Then, when both vehicle width direction end portions of the hood 12 tend to become displaced in the vehicle upward direction by the vibration that occurs in the hood 12, the long hole 82 in the cylinder 62 slides with respect to the coupling shaft unit 84 disposed on the swinging arm 40, and the actuator 60 (the cylinder 62 and the rod 70) relatively move in the vehicle upward direction with respect to the swinging arm 40. Because of this, the hinge arm 50 and both vehicle width direction end portions of the hood 12 become displaced to the raised position on the vehicle upper side of the pushed-up position.

Furthermore, when the actuator 60 has moved to the raised position, the spring washer 102 moves outward in the vehicle width direction because of its own springiness and becomes placed inside the engagement recess portion 104. Because of this, the spring washer 102 and the engagement recess portion 104 become engaged with each other (see FIG. 7B). As a result, the actuator 60 is retained in the raised position, and the hinge arm 50 and both vehicle width direction end portions of the hood 12 are retained in the raised position. Consequently, in the second embodiment also, the same action and effects as those in the first embodiment are achieved.

Third Embodiment

Figure 8A:
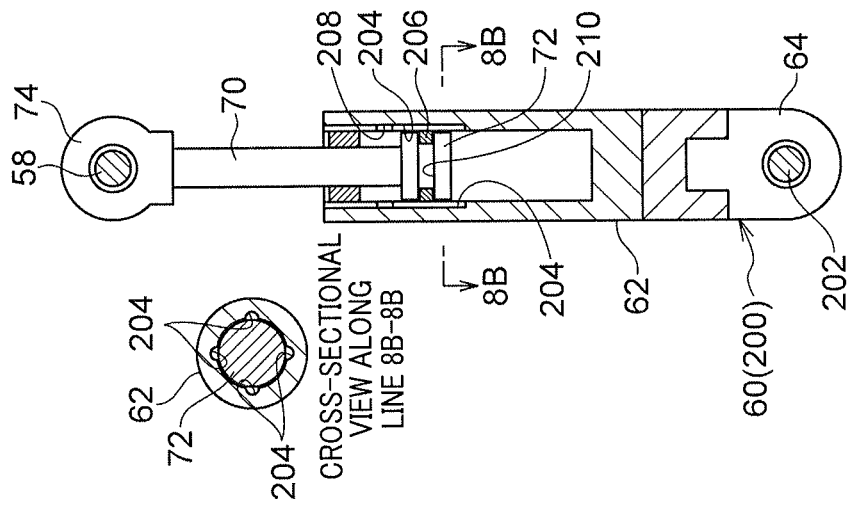
FIG. 8A is a cross-sectional view showing the inside of the actuator used in a third embodiment.

A vehicle pop-up hood device 200 pertaining to a third embodiment will be described below using FIG. 8A to FIG. 8C. The vehicle pop-up hood device 200 of the third embodiment is configured like in the first embodiment except for the points described below.

That is, in the third embodiment, the lock mechanism that locks the rod 70 to the cylinder 62 in the pushed-up position in the first embodiment is dispensed with. Furthermore, in the third embodiment, the coupling mechanism 80 is dispensed with, and the lower end portion of the cylinder 62 is rotatably coupled to the swinging arm 40 (not shown in FIG. 8A to FIG. 8C) by a hinge pin 202 whose axial direction coincides with the vehicle width direction.

Furthermore, gas escape grooves 204 are formed, as plural (four in the present embodiment) "gas escape portions", in the inner peripheral edge portion of the upper end portion of the cylinder 62. The gas escape grooves 204 extend in the vehicle upward and downward direction, open inward in the radial direction of the cylinder 62, and are placed every predetermined interval (every 90°) in the circumferential direction of the cylinder 62. Moreover, the gas escape grooves 204 are placed on the radial direction outside of the piston 72 of the rod 70 raised to the pushed-up position (see FIG. 8B). For this reason, when the piston 72 has been raised to the pushed-up position, the inside of the cylinder 62 to which the gas has been supplied and the outside of the cylinder 62 become communicated with each other by the gas escape grooves 204. Because of this, the gas supplied to the inside of the cylinder 62 is discharged from the gas escape grooves 204 to the outside of the cylinder 62, and the rod 70 (the piston 72) temporarily stops in the pushed-up position. It should be noted that the section of the cylinder 62 in which the gas escape grooves 204 are formed is configured so that relative movement of the piston 72 with respect to the cylinder 62 is possible.

Furthermore, in the third embodiment, the engagement piece 92 of the first embodiment is dispensed with, and the retention mechanism 90 is configured to include a C-ring 206 serving as an "engagement counterpart member" and an engagement groove 208 serving as an "engagement portion".

The C-ring 206 is formed in a partially open substantially annular shape and is placed on the outer peripheral portion of the piston 72 configuring the lower end portion of the rod 70. Furthermore, the C-ring 206 is configured to be elastically deformable in its radial direction. Additionally, the C-ring 206 is housed inside a housing groove 210 formed at the piston 72 in a state in which the C-ring 206 is elastically deformed in such a way that the radial dimension of the C-ring 206 is smaller.

The engagement groove 208 is formed at the inner peripheral portion of the upper end portion of the cylinder 62 and is formed along the circumferential direction of the cylinder 62. Furthermore, the engagement groove 208 is placed more on the upper end side of the cylinder 62 than the piston 72 raised to the pushed-up position and is placed in correspondence to the piston 72 raised to the raised position. Additionally, as shown in FIG. 8C, when the rod 70 (the piston 72) has been raised to the raised position, the C-ring 206 is configured to become elastically deformed outward in the radial direction and engage with the engagement groove 208. Because of this, in the raised position relative movement of the rod 70 with respect to the cylinder 62 is arrested.

Figure 8B:
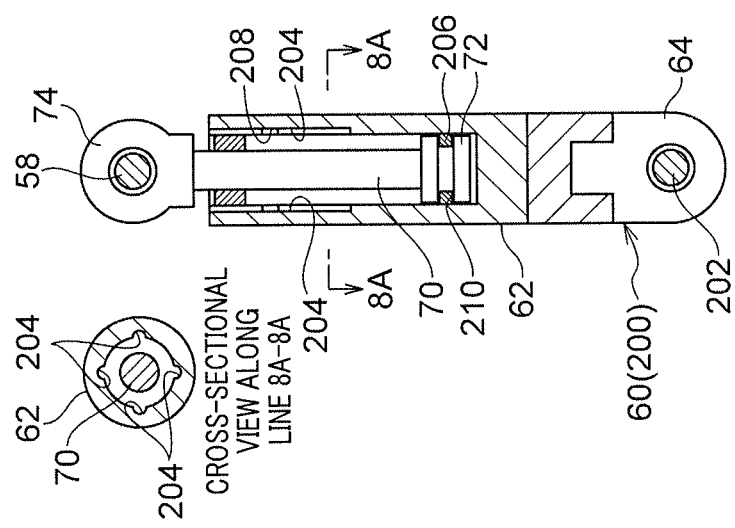
FIG. 8B is a cross-sectional view showing a state in which the rod has been raised to the pushed-up position from the state shown in FIG. 8A.

Additionally, like in the first embodiment, when the actuator 60 is activated, the gas is supplied to the inside of the cylinder 62 and the rod 70 rises to the pushed-up position (see FIG. 8B). Because of this, the hinge arm 50 is pushed up to the pushed-up position. Furthermore, at this time, the piston 72 of the rod 70 is placed on the inside, in the radial direction of the cylinder 62, of the gas escape grooves 204 in the cylinder 62. For this reason, the gas supplied to the inside of the cylinder 62 is discharged from the gas escape holes 204 to the outside of the cylinder 62. Because of this, the pushing-up of the hinge arm 50 by the rod 70 temporarily stops in the pushed-up position.

Then, when both vehicle width direction end portions of the hood 12 tend to become displaced in the vehicle upward direction by the vibration that occurs in the hood 12, the rod 70 rises to the raised position with respect to the cylinder 62 (the swinging arm 40) (see FIG. 8C). Because of this, the hinge arm 50 and both vehicle width direction end portions of the hood 12 become displaced to the raised position.

Furthermore, when the rod 70 has risen to the raised position, the C-ring 206 disposed on the piston 72 becomes elastically deformed outward in the radial direction of the piston 72 and engages with the engagement groove 208 in the cylinder 62. As a result, the rod 70 is retained in the raised position, and the hinge arm 50 and both vehicle width direction end portions of the hood 12 are retained in the raised position. Consequently, in the third embodiment also, the amplitude of the vibration of the hood 12 that occurs when the hood 12 is pushed up can be reduced.

Furthermore, in the third embodiment, when the rod 70 is raised to the pushed-up position, the gas supplied to the cylinder 62 is discharged to the outside of the cylinder 62 by the gas escape grooves 204. Consequently, after the actuation of the actuator 60, the rod 70 can be raised to the raised position while allowing the gas inside the cylinder 62 to escape.

Fourth Embodiment

A vehicle pop-up hood device 300 pertaining to a fourth embodiment will be described below using FIG. 9A to FIG. 9D. The vehicle pop-up hood device 300 of the fourth embodiment is configured like in the first embodiment except for the points described below.

That is, in the fourth embodiment, the coupling mechanism 80 of the first embodiment is dispensed with, and like in the third embodiment the lower end portion of the cylinder 62 is rotatably coupled to the swinging arm 40 (not shown in FIG. 9A to FIG. 9D) by the hinge pin 202 whose axial direction coincides with the vehicle width direction.

Furthermore, in the fourth embodiment, the rod 70 is configured to include a first rod 302 and a second rod 304. That is, the rod 70 has a so-called dual structure. Specifically, the piston 72 of the rod 70 configures the lower end portion of the first rod 302. Furthermore, the first rod 302 has a housing portion 302A serving as a "tubular portion" having a tubular shape, and the housing portion 302A is disposed extending in the vehicle upward direction from the piston 72 and is placed coaxially with the piston 72.

The second rod 304 is formed in a substantially round rod shape. Furthermore, the second rod 304 is placed coaxially with the first rod 302 and is housed inside the housing portion 302A so as to be relatively movable in the vehicle upward direction with respect to the first rod 302. Moreover, a substantially cylindrical piston portion 304A is integrally formed on the lower end portion of the second rod 304, and the rod coupling portion 74 is integrally formed on the upper end portion of the second rod 304. Additionally, in a state in which the first rod 302 has been raised to the pushed-up position (the state shown in FIG. 9B), the second rod 304 relatively moves in the vehicle upward direction with respect to the first rod 302 so that the second rod 304 becomes placed in the raised position (see FIG. 9C). Because of this, the hinge arm 50 is configured to become displaced to the raised position.

Figure 9A:
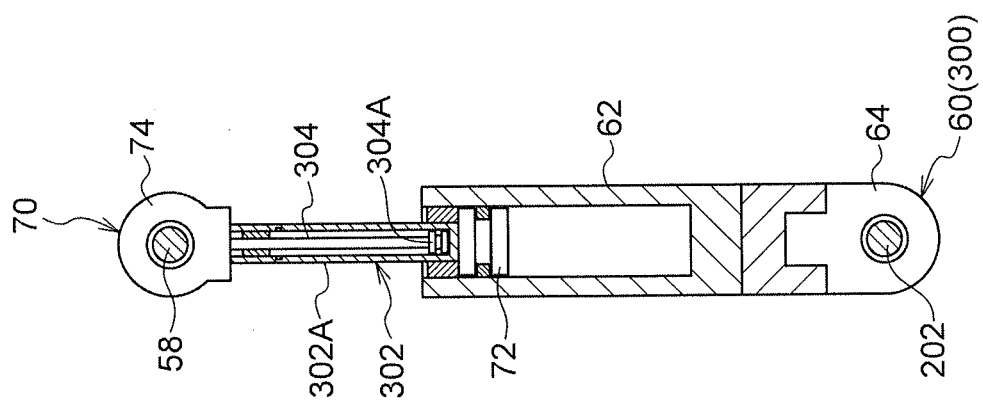
FIG. 9A is a cross-sectional view showing the inside of the actuator used in a fourth embodiment.
Figure 9B:
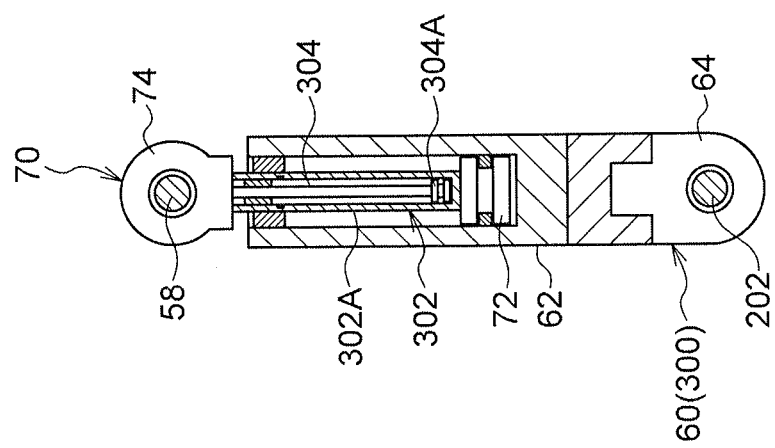
FIG. 9B is a cross-sectional view showing a state in which a first rod and a second rod have been raised to the pushed-up position from the state shown in FIG. 9A.
Figure 9D:
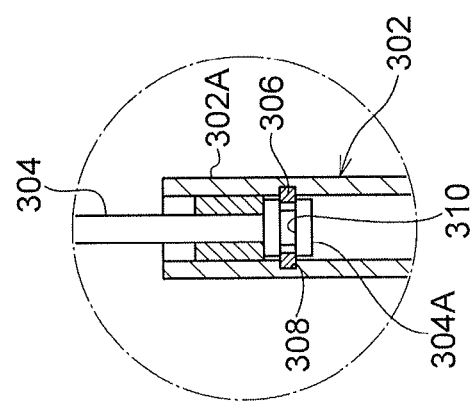
FIG. 9D is a cross-sectional view (an enlarged view of portion 9D of FIG. 9C) showing a state in which a C-ring is engaged with an engagement groove in FIG. 9C.

Furthermore, in the fourth embodiment, the engagement piece 92 of the first embodiment is dispensed with, and the retention mechanism 90 is, as shown in FIG. 9D, configured to include a C-ring 306 serving as an "engagement counterpart member" and an engagement groove 308 serving as an "engagement portion".

The C-ring 306 is formed in a partially open substantially annular shape and is disposed on the outer peripheral portion of the piston portion 304A of the second rod 304. Furthermore, the C-ring 306 is configured to be elastically deformable in its radial direction. Additionally, the C-ring 306 is housed inside a housing groove 310 formed at the second rod 304 in a state in which the C-ring 306 is elastically deformed in such a way that the radial dimension of the C-ring 306 is smaller.

The engagement groove 308 is formed at the inner peripheral portion of the upper end portion of the housing portion 302A of the first rod 302 and is formed along the circumferential direction of the housing portion 302A. Furthermore, the engagement groove 308 is placed in correspondence to the piston portion 304A of the second rod 304 raised to the raised position. Additionally, when the second rod 304 has been raised to the raised position, the C-ring 306 is configured to become elastically deformed outward in the radial direction of the piston portion 304A and engage with the engagement groove 308. Because of this, in the raised position relative movement of the second rod 304 with respect to the first rod 302 (the cylinder 62) is arrested.

Additionally, like in the first embodiment, when the actuator 60 is activated, the gas is supplied to the inside of the cylinder 62, and the first rod 302 and the second rod 304 rise to the pushed-up position (see FIG. 9B). Because of this, the hinge arm 50 is pushed up to the pushed-up position. Furthermore, at this time, the first rod 302 is locked with respect to the cylinder 62 by the lock mechanism not shown in the drawings.

Figure 9C:
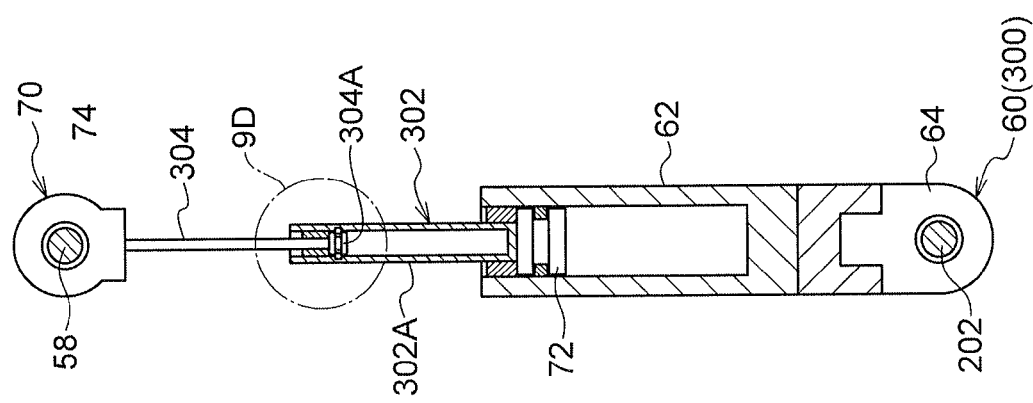
FIG. 9C is a cross-sectional view showing a state in which the second rod has been raised to the raised position from the state shown in FIG. 9B.

From this state, when both vehicle width direction end portions of the hood 12 tend to become displaced in the vehicle upward direction by the vibration that occurs in the hood 12, the second rod 304 rises to the raised position with respect to the first rod 302 (the swinging arm 40) (see FIG. 9C). Because of this, the hinge arm 50 and both vehicle width direction end portions of the hood 12 become displaced to the raised position on the vehicle upper side of the pushed-up position.

Furthermore, when the second rod 304 has risen to the raised position, the C-ring 306 disposed on the piston portion 304A of the second rod 304 becomes elastically deformed outward in the radial direction of the piston portion 304A and engages with the engagement groove 308 formed at the housing portion 302A of the first rod 302 (see FIG. 9D). As a result, the second rod 304 is retained in the raised position, and the hinge arm 50 and both vehicle width direction end portions of the hood 12 are retained in the raised position. Consequently, in the fourth embodiment also, the amplitude of the vibration of the hood 12 that occurs when the hood 12 is pushed up can be reduced.

Furthermore, in the fourth embodiment, the rod 70 is configured to include the first rod 302 and the second rod 304, and the second rod 304 is configured to be relatively movable in the vehicle upward direction with respect to the first rod 302. For this reason, the second rod 304 (the hinge arm 50) can be relatively moved in the vehicle upward direction with respect to the swinging arm 40 while controlling an increase in the axial direction extent of the actuator 60.

Fifth Embodiment

Figure 10A:
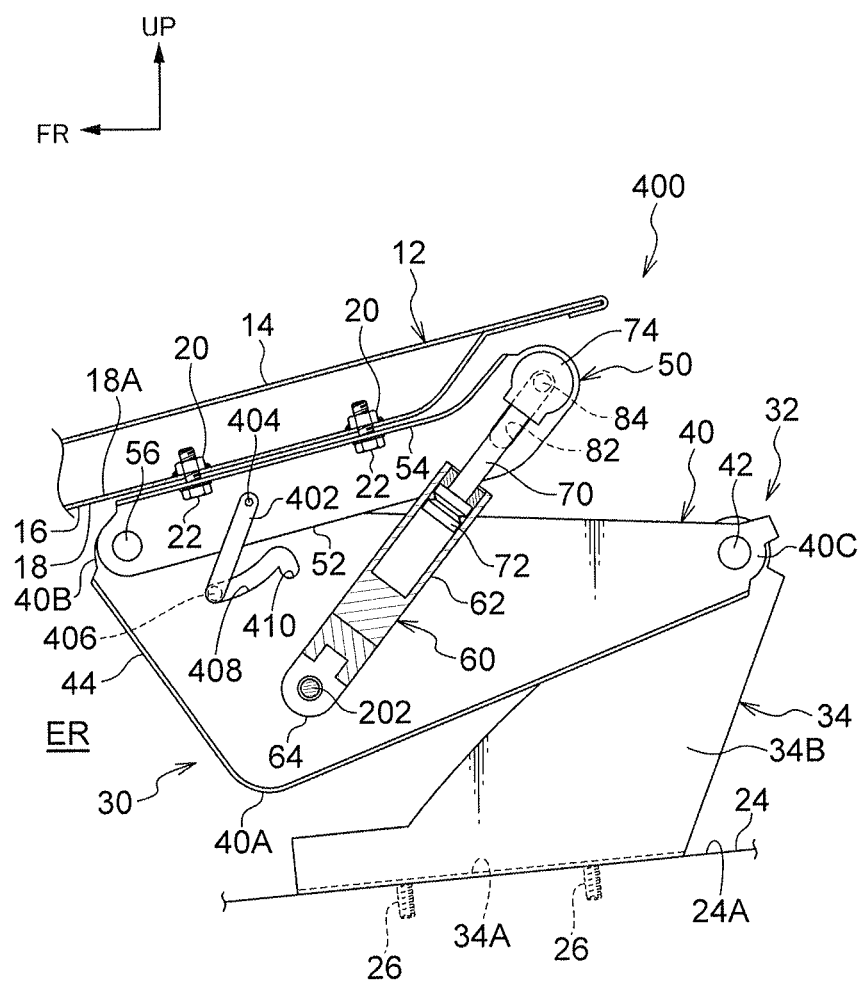
FIG. 10A is a partially cut side view showing a state in which the rod of a vehicle pop-up hood device pertaining to a fifth embodiment has pushed up the hinge arm to the pushed-up position.
Figure 10B:
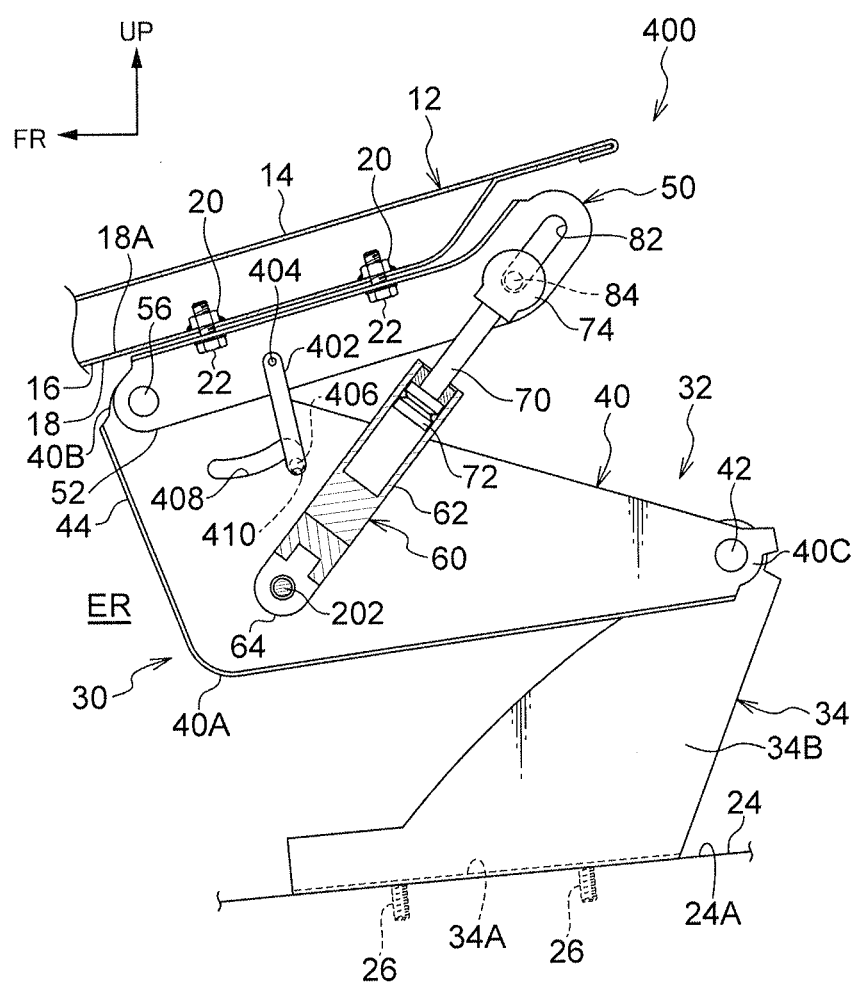
FIG. 10B is a partially cut side view showing a state in which the hinge arm has been raised to the raised position from the state shown in FIG. 10A.

A vehicle pop-up hood device 400 pertaining to a fifth embodiment will be described below using FIG. 10A and FIG. 10B. The vehicle pop-up hood device 400 of the fifth embodiment is configured like in the first embodiment except for the points described below.

That is, in the fifth embodiment, the coupling mechanism 80 of the first embodiment is applied to the section where the rod 70 and the hinge arm 50 are coupled to each other. Additionally, like in the third embodiment and the fourth embodiment, the lower end portion of the cylinder 62 is rotatably coupled to the swinging arm 40 by the hinge pin 202 whose axial direction coincides with the vehicle width direction.

The long hole 82 configuring the coupling mechanism 80 is formed at the rear end portion of the hinge arm 50 and slopes in the vehicle rearward direction heading in the vehicle upward direction as seen in a side view so as to lie along the axial direction of the actuator 60. Moreover, the coupling shaft unit 84 configuring the coupling mechanism 80 is integrally disposed on the rod coupling portion 74 of the rod 70, and the threaded portion 86B of the coupling shaft unit 84 is slidably inserted inside the long hole 82. Additionally, in the non-activated state of the actuator 60, the coupling shaft unit 84 is placed in the upper end portion of the long hole 82.

Furthermore, in the fifth embodiment, the engagement piece 92 of the first embodiment is dispensed with, and the retention mechanism 90 is configured to include an engagement arm 402 serving as an "engagement counterpart member" and an engagement groove 408.

The engagement arm 402 is formed in a substantially rectangular plate shape and is placed on the vehicle width direction inside of the hinge arm 50 with its plate thickness direction coinciding with the vehicle width direction. Additionally, one end portion of the engagement arm 402 is rotatably joined to the lengthwise direction middle portion of the hinge arm 50 by a pin 404 whose axial direction coincides with the vehicle width direction. Furthermore, a substantially cylindrical retention pin 406 is integrally disposed on the other end portion of the engagement arm 402, and the retention pin 406 projects outward in the vehicle width direction from the engagement arm 402.

The engagement groove 408 is formed at the swinging arm 40. The engagement groove 408 slopes in the vehicle upward direction heading in the vehicle rearward direction as seen in a side view and curves in a substantially circular arc shape that becomes convex obliquely downward in the vehicle rearward direction. Furthermore, the rear end portion of the engagement groove 208 is bent obliquely downward in the vehicle rearward direction as seen in a side view, and this section serves as an engagement portion 410. Additionally, the retention pin 406 of the engagement arm 402 is slidably inserted inside the engagement groove 408, and in the non-activated state of the actuator 60, the retention pin 406 is placed in the front end portion of the engagement groove 408.

Additionally, like in the first embodiment, when the actuator 60 is activated, the gas is supplied to the inside of the cylinder 62, the rod 70 rises to the pushed-up position, and the hinge arm 50 is pushed up the pushed-up position. At this time, the rod 70 is locked with respect to the cylinder 62 by the lock mechanism not shown in the drawings (see FIG. 10A).

From this state, when both vehicle width direction end portions of the hood 12 tend to become displaced in the vehicle upward direction by the vibration that occurs in the hood 12, the rear end portion of the hinge arm 50 relatively moves to the raised position with respect to the rod 70. That is to say, the long hole 82 formed at the hinge arm 50 relatively moves in the vehicle upward direction with respect to the coupling shaft unit 84 disposed on the rod 70. Because of this, both vehicle width direction end portions of the hood 12 become displaced to the raised position on the vehicle upper side of the pushed-up position (see FIG. 10B).

Furthermore, when the hinge arm 50 becomes displaced to the raised position, the hinge arm 50 is relatively rotated with respect to the swinging arm 40. At this time, the engagement arm 402 rotates about the axis of the pin 404, and the retention pin 406 of the engagement arm 402 moves from the front end portion to the rear end portion of the engagement groove 408. Then, when the retention pin 406 reaches the rear end portion of the engagement groove 408, the retention pin 406 becomes engaged with the engagement portion 410 of the engagement groove 408. As a result, the hinge arm 50 is retained in the raised position, and both vehicle width direction end portions of the hood 12 are retained in the raised position (see FIG. 10B). Consequently, in the fifth embodiment also, the amplitude of the vibration of the hood 12 that occurs when the hood 12 is pushed up can be reduced.

Furthermore, in the fifth embodiment, the engagement arm 402 is rotatably disposed on the hinge arm 50. Additionally, when the hinge arm 50 has become displaced to the raised position, the retention pin 406 of the engagement arm 402 becomes engaged with the engagement portion 410 of the engagement groove 408 formed at the swinging arm 40, so that the hinge arm 50 is retained in the raised position. Because of this, the hinge arm 50 can be retained in the raised position by a simple configuration.

Figure 11A:
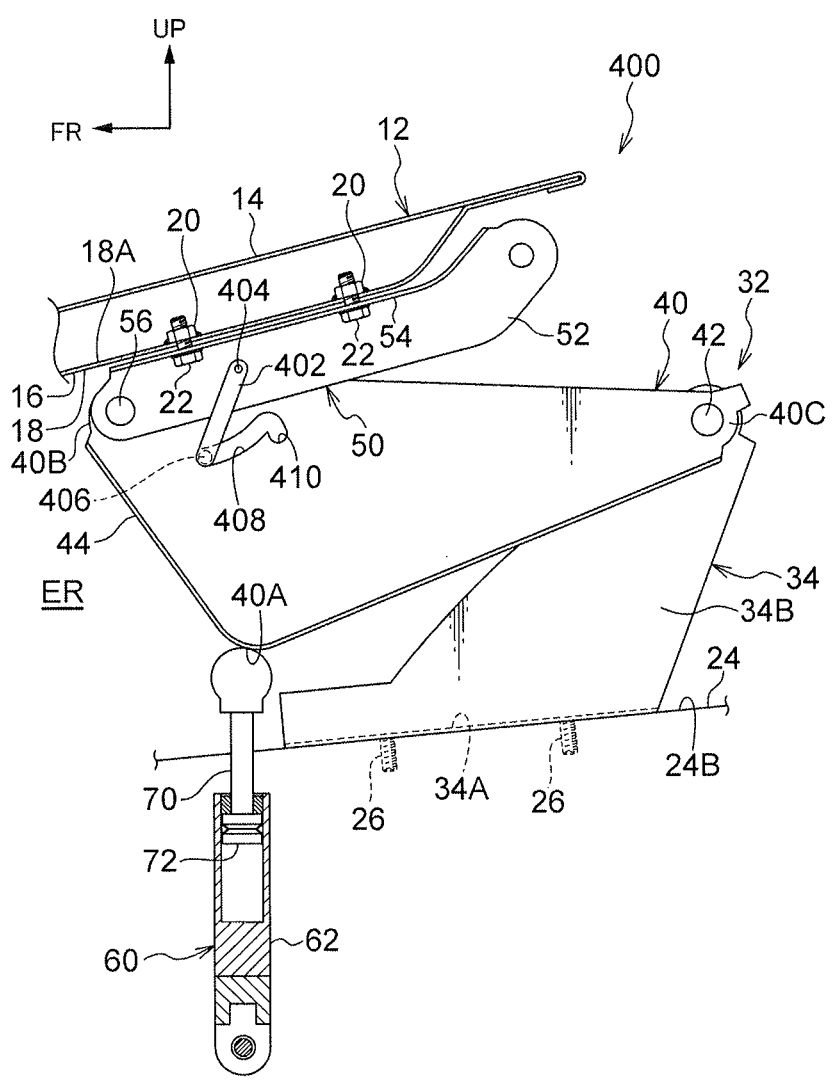
FIG. 11A is a partially cut side view showing a state in which the rod has pushed up the hinge arm to the pushed-up position in another example of the vehicle pop-up hood device pertaining to the fifth embodiment.

It should be noted that in the fifth embodiment the cylinder 62 of the actuator 60 is coupled to the swinging arm 40, and the rod 70 of the actuator 60 is configured to push up the hinge arm 50 to the pushed-up position. Instead of this, as shown in FIG. 11A, the cylinder 62 of the actuator 60 may be secured to the vehicle body, and the rod 70 of the actuator 60 may be configured to push up the lower end portion 40A of the swinging arm 40 to the pushed-up position. Consequently, to "push up the arm to the pushed-up position" in the present invention also includes a case where the actuator 60 pushes up the hinge arm 50 via another member.

Figure 11B:
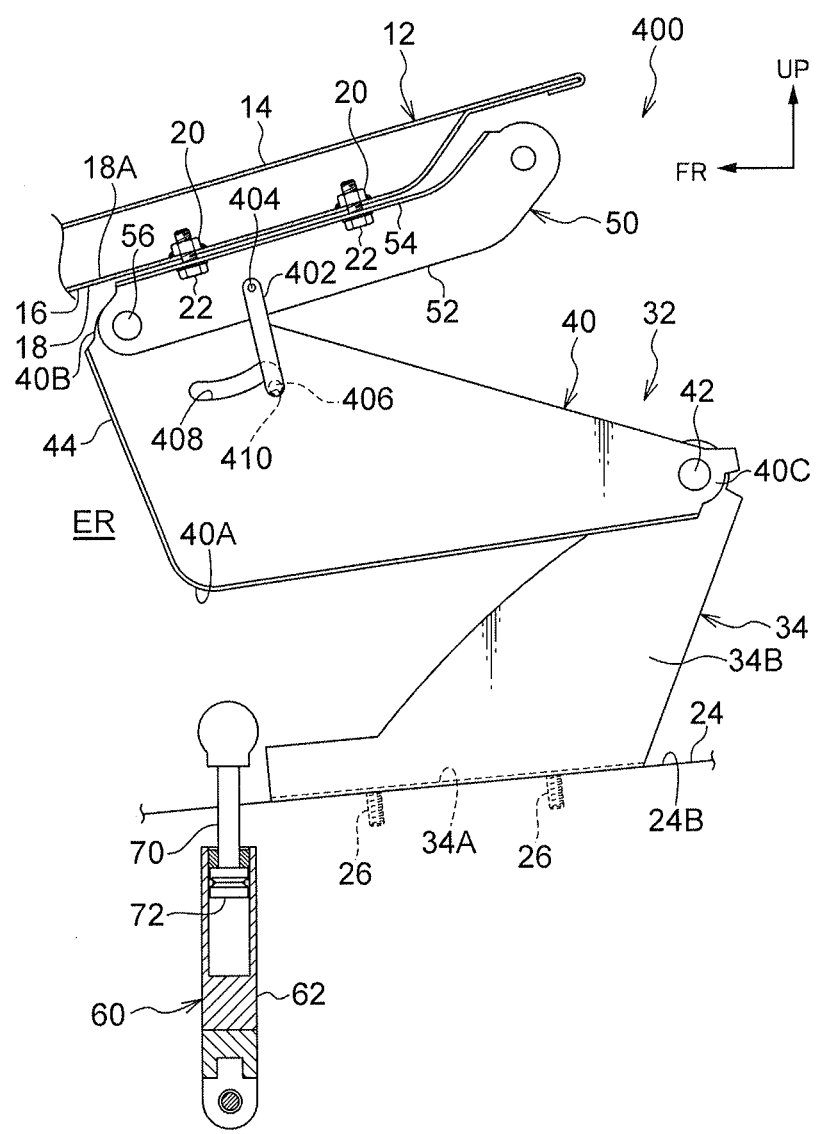
FIG. 11B is a partially cut side view showing a state in which the hinge arm has been raised to the raised position from the state shown in FIG. 11A.

Additionally, in this case, the vehicle pop-hood device may be configured in such a way that, when the rod 70 of the actuator 60 pushes up the swinging arm 40, the shear pin joining together the hinge arm 50 and the swinging arm 40 becomes broken, and in the pushed-up position the hinge arm 50 relatively rotates in the vehicle upward direction with respect to the swinging arm 40. Because of this, when the hood 12 tends to become displaced in the vehicle upward direction from the pushed-up position by the vibration that occurs in the hood 12, the hinge arm 50 rises to the raised position with respect to the swinging arm 40. Additionally, as shown in FIG. 11B, the retention pin 406 of the engagement arm 402 becomes engaged with the engagement portion 410 of the engagement groove 408 so that the hinge arm 50 is retained in the raised position.

Furthermore, in the first embodiment to the fifth embodiment, the pop-up mechanism portion 30 is disposed on both vehicle width direction end portions of the rear end portion of the hood 12, but the pop-up mechanism portion 30 may also be disposed on both vehicle width direction end portions of the front end portion of the hood 12 in correspondence to the specifications of various types of vehicles. In this case, for example, the vehicle pop-up hood device may be configured in such a way that the hood 12 and the hinge arm 50 become unsecured from each other in conjunction with the unlocking of the hood lock.

The invention claimed is:

1. A vehicle pop-up hood device comprising:
    an arm that is secured to a vehicle width direction end portion of a hood;
    a swinging arm that interconnects a base and the arm as a result of one portion of the swinging arm being rotatably attached to the base secured to a vehicle body and the arm being rotatably coupled to another portion of the swinging arm;
    an actuator which, upon being actuated, pushes up the arm to a pushed-up position; and
    a retention mechanism that holds the arm in a raised position after the arm is upwardly rotated with respect to the swinging arm from the pushed-up position to the raised position because of vibration that occurs in the hood as a result of the actuator pushing up the arm.

2. The vehicle pop-up hood device according to claim 1, wherein
    the actuator is configured to include
        a cylinder that is coupled to the swinging arm and
        a rod that is coupled to the arm in a state in which the rod is housed in the cylinder and which becomes raised to the pushed-up position by a gas supplied to an inside of the cylinder, and
    the rod raised to the pushed-up position is relatively movable in a vehicle upward direction with respect to the swinging arm.

3. The vehicle pop-up hood device according to claim 2, wherein
    the cylinder is coupled to the swinging arm so as to be relatively movable in the vehicle upward direction,
    the retention mechanism has an engagement portion disposed on the cylinder, and
    the cylinder is retained in the raised position as a result of the engagement portion becoming directly or indirectly engaged with the swinging arm in the raised position.

4. The vehicle pop-up hood device according to claim 3, wherein
    a shaft portion is disposed on one of the swinging arm and the cylinder, and the shaft portion projects toward the other of the swinging arm and the cylinder, and
    a long hole is formed at the other of the swinging arm and the cylinder, the shaft portion is slidably inserted into the long hole, and the long hole allows the cylinder to be coupled to the swinging arm so as to be relatively movable in the vehicle upward direction.

5. The vehicle pop-up hood device according to claim 4, wherein in a non-activated state of the actuator, the shaft portion is placed in an end portion on one lengthwise direction side of the long hole, and in a state in which the cylinder is retained in the raised position, the shaft portion is placed in an end portion on the other lengthwise direction side of the long hole.

6. The vehicle pop-up hood device according to claim 4, wherein a sliding amount of the shaft portion with respect to the long hole is set smaller compared to a rising amount of the rod that becomes raised to the pushed-up position.

7. The vehicle pop-up hood device according to claim 3, wherein
    the engagement portion is configured to be elastically deformable, and
    the cylinder is retained in the raised position as a result of the engagement portion coming into contact with the swinging arm directly or via another member and becoming elastically deformed.

8. The vehicle pop-up hood device according to claim 2, wherein
    gas escape portions are formed at the cylinder, the gas escape portions discharging to an outside of the cylinder the gas supplied to the inside of the cylinder as a result of the rod being raised to the pushed-up position, the retention mechanism is equipped with an engagement portion formed at an inner peripheral portion of the cylinder and an engagement counterpart member disposed on the rod, and the rod is retained in the raised position as a result of the engagement counterpart member becoming engaged with the engagement portion in the raised position.

9. The vehicle pop-up hood device according to claim 8, wherein the gas escape portions are gas escape grooves formed at an inner peripheral edge portion of the cylinder, and the gas escape grooves extend along an axial direction of the cylinder.

10. The vehicle pop-up hood device according to claim 2, wherein the rod is configured to include a first rod and a second rod, the first rod has a tubular portion having a tubular shape, the second rod is coupled to the arm and is housed in the tubular portion so as to be relatively movable in an axial direction of the actuator, the retention mechanism is equipped with an engagement portion formed at an inner peripheral portion of the tubular portion and an engagement counterpart member disposed on the second rod, and the second rod is retained in the raised position as a result of the engagement counterpart member becoming engaged with the engagement portion in the raised position.

11. The vehicle pop-up hood device according to claim 1, wherein the retention mechanism is equipped with an engagement portion formed at the swinging arm and an engagement counterpart member having one end portion rotatably coupled to the arm, and the arm is retained in the raised position as a result of the engagement counterpart member being rotated in accompaniment with a relative rotation of the arm with respect to the swinging arm and the other end portion of the engagement counterpart member becoming engaged with the engagement portion.

\* \* \* \* \*